United States Patent [19]

Murphy et al.

[11] Patent Number: 4,785,396
[45] Date of Patent: Nov. 15, 1988

[54] PUSH-PULL SERIAL BUS COUPLED TO A PLURALITY OF DEVICES EACH HAVING COLLISION DETECTION CIRCUIT AND ARBITRATION CIRCUIT

[75] Inventors: Sean T. Murphy; Narjala Bhasker, both of Portland; Peter D. MacWilliams, Aloha; Stephen J. Packer, Beaverton, all of Oreg.

[73] Assignee: Intel Corporation, Santa Clara, Calif.

[21] Appl. No.: 148,763

[22] Filed: Jan. 26, 1988

Related U.S. Application Data

[63] Continuation of Ser. No. 823,358, Jan. 28, 1986, abandoned, which is a continuation-in-part of Ser. No. 555,026, Nov. 25, 1983, abandoned.

[51] Int. Cl.[4] .................. G06F 13/40; G06F 11/00
[52] U.S. Cl. .................. 364/200; 370/85; 375/36; 340/825.5; 371/68
[58] Field of Search ... 364/200 MS File, 900 MS File; 371/57, 67, 68; 340/825.5, 825.51, 825.7; 375/36; 370/85

[56] References Cited

U.S. PATENT DOCUMENTS

| | | | |
|---|---|---|---|
| 3,875,332 | 4/1975 | Fletcher et al. | 375/36 X |
| 4,281,380 | 7/1981 | DeMesa, III. et al. | 364/200 |
| 4,341,927 | 7/1982 | Shinoi et al. | 375/36 X |
| 4,369,516 | 1/1983 | Byrns | 371/68 X |
| 4,379,294 | 4/1983 | Sutherland et al. | 340/825.5 |
| 4,380,060 | 4/1983 | Wilhelm | 375/36 |
| 4,380,080 | 4/1983 | Rattlingourd | 375/36 |
| 4,412,335 | 10/1983 | Froment et al. | 375/36 |
| 4,439,856 | 3/1984 | Ulug | 370/85 |
| 4,442,521 | 4/1984 | Inaba et al. | 371/68 |
| 4,476,467 | 10/1984 | Terwilliger et al. | 340/825.5 |
| 4,479,228 | 10/1984 | Crane | 340/825.5 X |
| 4,494,113 | 1/1985 | Yamaoka et al. | 370/85 |
| 4,507,778 | 3/1985 | Tan | 370/94 |
| 4,611,274 | 9/1986 | Machino et al. | 340/825.5 |
| 4,623,886 | 11/1986 | Livingston | 370/94 |
| 4,627,076 | 12/1986 | Staal et al. | 375/36 |

Primary Examiner—Raulfe B. Zache
Assistant Examiner—Thomas C. Lee
Attorney, Agent, or Firm—Blakely, Sokoloff, Taylor & Zafman

[57] ABSTRACT

A high speed serial bus is disclosed have particular application for use in passing messages in a multiple processor computer system. The serial bus includes a three-wire serial link having lines identified as "SDA", "SDB" and "ground". The ground line provides a common reference for all devices coupled to the serial bus. A message controller is coupled to each agent for transmitting and receiving serial data along the bus. Both lines of the serial bus as well as the ground are coupled to a bus state detector in the message controller which provides three basic signal outputs. The bus state detector determines whether or not the bus is in use, a collision has occurred between messages, and decodes data received on the bus. Data which is transmitted along the serial bus is driven on lines SDA and SDB 180 degrees out of phase relative to each other. The message controller encodes messages to be transmitted using, in the present embodiment, well known Manchester encoding techniques. A bus idle state occurs when all transmitters are off allowing both lines SDA and SDB be pulled high by pull-up resistors. Valid data states may occur any time a single transmitter is transmitting. When two or more transmitters begin transmitting a collision state exists. The message controller recognizes collisions and provides a back-off algorithm.

5 Claims, 25 Drawing Sheets

SERIAL MESSAGE CONTROLLER

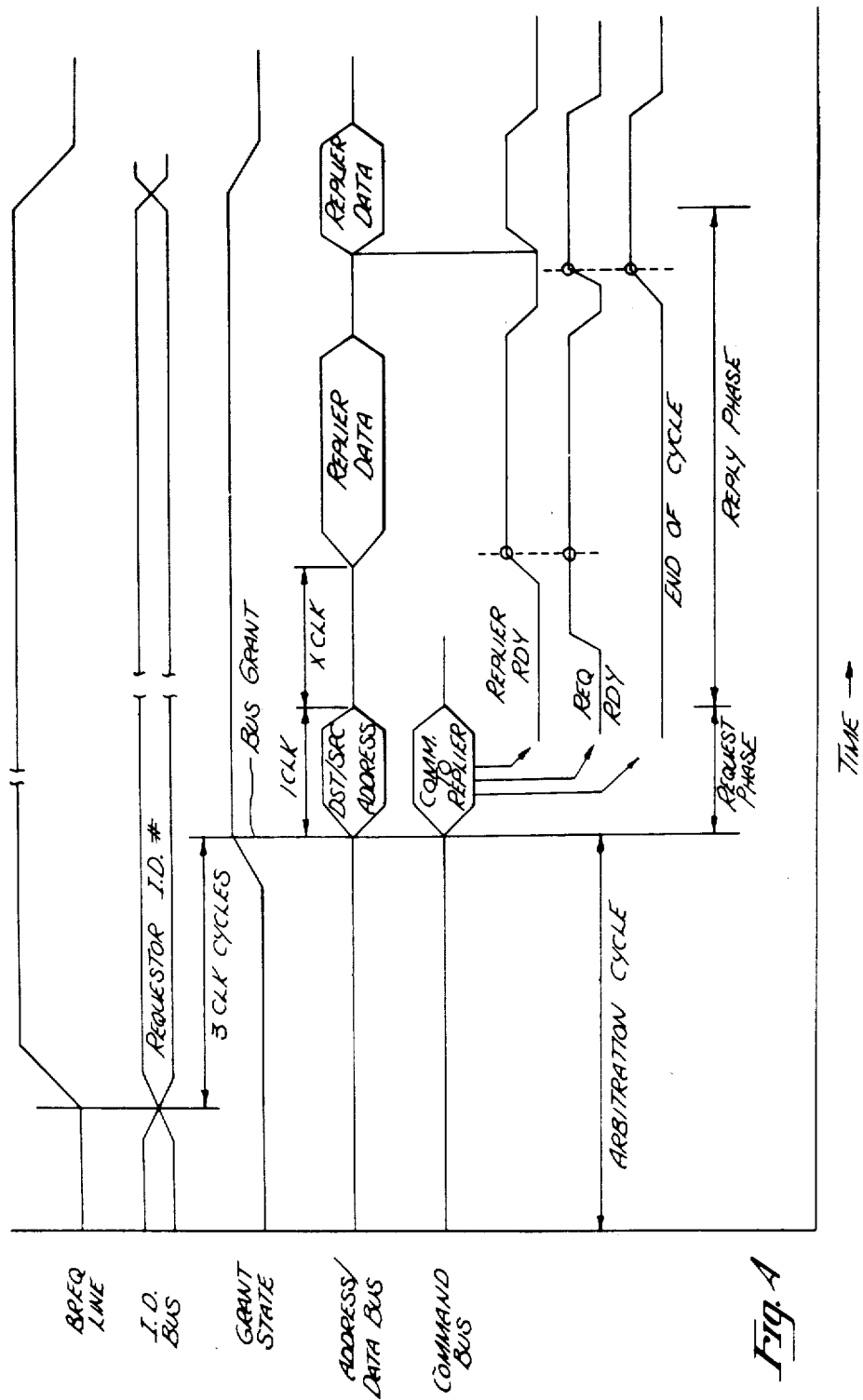

SERIAL MESSAGE CONTROLLER

Fig. 17  READ ACCESS WITH WAIT

Manchester Encoding

| SBD | SDA | OPERATION |
|---|---|---|
| LOW | LOW | CSMA/CD COLLISION DETECT |
| LOW | HIGH | DATA = LOGIC 1, VALID |
| HIGH | LOW | DATA = LOGIC 0, VALID |
| HIGH | HIGH | BUS IDLE |

PUSH-PULL SERIAL BUS COUPLED TO A PLURALITY OF DEVICES EACH HAVING COLLISION DETECTION CIRCUIT AND ARBITRATION CIRCUIT

This is a continuation of application Ser. No. 06/823,358, filed Jan. 28, 1986, now abandoned which is a continuation-in-part of Ser. No. 06/555,026, filed Nov. 25, 1983, now abandoned.

BACKGROUND OF THE INVENTION

The present application is related to U.S. patent application Ser. Nos. 06/555,027 now U.S. Pat. No. 4,570,220, and 06/555,028, now abandoned, and hereby refers to, and incorporates by reference the contents of the above-referenced applications.

1. Field of the Invention

The present invention relates to apparatus and methods for transferring data between a source and a plurality of receiving data processing devices using a serial bus with features and characteristics generally found in parallel bus systems. More specifically, the present invention supports multiple master stations with no single point of failure (any agent can be removed or added without failure of the bus), fair and deterministic access, reliable transmission with immediate notification of errors, and a dualistic protocol for intelligent interrupts (short datagram-like packets with low latency) and high throughput for large amounts of data.

2. Art Background

In the computing industry it is quite common to transfer data and commands between a plurality of data processing devices, such as for example, computers, printers, memories, and the like, on a system or data bus. A data processing system typically includes a processor which executes instructions that are stored at addresses in a memory. The data that is processed is transferred into and out of the system by way of input/output (I/O) devices, onto a bus which interconnects the data processing system with other digital hardware. Computer systems constructed with multiple microcomputers fall into two general categories. First, one can create a system with multiple homogeneous processors which can share the computing load dynamically under the control of a single operating system. Second, one can statically partition a computer into modules each with a single processor and a specific function. The functional partitioning allows systems to be constructed of heterogeneous processor and operating systems. The present invention deals with this latter architecture. A key element to the success of a functionally partitioned system is the method of communication between the modules. Functional partitions of a system communicate with one another by sending processed data. The link between the functional partitions can be messages transmitted through a serial or parallel bus.

With the ever increasing capability found in VLSI, the cost of a system will be dominated by the cost of the interconnect between the functional partitions. This cost is proportional to the number of signal wires needed to accomplish the interconnect (60 pins for a typical 32-bit system). The present invention's serial bus permits a low cost implementation because it reduces the signal wire count to just a few wires (2 to 4). If the peripheral devices of a system implement the present invention's serial bus interface, the device controllers which typically convert signals on a prallel system bus to the peripheral I/O bus can be completely eliminated. Thus, the present invention's serial bus considerably reduces the cost of a system.

The present invention's serial bus offers features that are consistent with those offered on a parallel system bus. For example, the present invention permits:

1. A capacity of more than 20 master stations.
2. Deterministic access to the bus for transmission of data.
3. Immediate detection and reporting of errors. Typical prior art serial buses rely on software to detect lost or erroneously received data.
4. Low latency for interrupts.
5. High throughput for transfer of large blocks of data without adversely affecting interrupt latency. For example, memory to memory transfers on the bus do not inhibit the sending of an interrupt for more than a fixed interval.
6. No single point of failure; stations can leave and enter the bus at any time. The present invention's serial bus is intended to be used for key boards, printers, and monitors and these are commonly powered by separate sources.
7. The entire interface and protocol is implementable in a 2 micron CMOS design to allow its inclusion in a micro controller.

Various methods have been devised in order to convey data between a data processing device and a peripheral unit which may be, for example, a memory unit, a second processor unit, a disk drive or the like. For example, in U.S. Pat. No. 4,439,856, issued Mar. 27, 1984, to Ulug, a bus communication system is disclosed having a plurality of bus interface units (BIUs). Each BIU includes a transmission system operable in both a contention mode and a token passing mode. In the contention mode, the transmission system completes the transmission of information packets only after the BIU senses the bus and determines that no additional information packets are being transmitted on the bus. During token passing mode, the transmission system transmits an information packet only after the expiration of a time interval unique to that BIU, and determined by the relative location both of that BIU and of the last BIU to transmit either information or start-up packet on the bus. Accordingly, Ulug discloses a bi-modal operation. This differs from the design of the present invention's high speed serial bus. Ulug defines a method of transfer of information packets only, and does not address a method of acknowledgement. Furthermore, unlike the present invention, the design of Ulug is not decentralized and permits a single point of failure within the network. Ulug requires a dependancy upon adjacent BIUs for token passing, and does not permit fair access to the bus by multiple masters. The transmission speed of Ulug is relatively low. The time is required to support token passing mode is such that the timers are highly likely to get out of skew and are therefore not applicable to high transmission rate systems. As will be described in the present application, the present invention provides acknowledgements at the bus level in the high speed serial bus. The acknowledgements of the present invention are out of band and have no effect on bus performance.

As will be appreciated, the present invention provides a data processing system architecture which includes multiple bus structures in order to optimize data and message transfers between multiple processors, as well as an orderly allocation of system resources to all devices residing on each bus. The present invention's bus structure comprises a general purpose parallel bus, as well as a serial bus which is interconnected through system interfaces which define the communication and data transfer protocols.

SUMMARY OF THE INVENTION

A high speed serial bus is disclosed have particular application for use in passing messages in a multiple processor computer system. The serial bus includes a three-wire serial link having lines identified as "SDA", "SDB" and "ground". The ground line provides a common reference for all devices coupled to the serial bus. A message controller is coupled to each agent for transmitting and receiving serial data along the bus. Both lines of the serial bus as well as the ground are coupled to a bus state detector in the message controller which provides three basic signal outputs. The bus state detector determines whether or not the bus is in use, a collision has occurred between messages, and decodes data received on the bus. Data which is transmitted along the serial bus is driven on lines SDA and SDB 180 degrees out of phase relative to each other. The message controller encodes messages to be transmitted using, in the present embodiment, well known Manchester encoding techniques. A bus idle state occurs when all transmitters are off allowing both lines SDA and SDB be pulled high by pull-up resistors. Valid data states may occur any time a single transmitter is transmitting. When two or more transmitters begin transmitting a collision state exists. The message controller recognizes collisions and provides a back-off algorithm. Due to the nature in which data is transmitted along the serial bus, the sum of the colliding messages between one or more transmitting stations cause both lines SDA and SDB to go low. The present invention resolves the collision in a deterministic manner guaranteeing that no agent will require more than a set maximum time to gain access to the serial bus. All agents on a serial bus must monitor the bus at all times for collisions. Anytime an agent detects a collision, the access control of the present invention switches into a collision resolution mode. Upon detecting the occurrence of a collision, all agents coupled to serial bus initiate JAM, WAIT, CLEAR, and IDLE cycles and then each transmitting station simultaneously begins counting through predetermined time slots #0 through #N. Each agent coupled to the serial bus is allocated one of the unique time slots in which to retransmit its message. In the absence of a collision, each agent encapsulates and transmits its message along the serial bus and awaits the receipt of an acknowledgement message from the replying processor during the interframe space following the message. Assuming that the acknowledgement is received within the interframe space, the serial message cycle is then complete.

BRIEF DESCRIPTION OF THE DRAWINGS

FIG. 4 is a timing diagram which illustrates the parallel system bus protocol for data transfer between agents coupled to the parallel bus.

DETAILED DESCRIPTION OF THE INVENTION

General System Description

A multiple bus system architecture and improved data transfer methods are disclosed for transferring data between a plurality of data processing resources. In the following description for purposes of explanation, specific numbers, bytes, registers, addresses, times, signals, etc. are set forth in order to provide a thorough understanding of the present invention. However, it will be apparent to one skilled in the art that the present invention may be practised without these specific details. In other instances, well known circuits and devices are shown in block diagram form in order not to obscure the present invention unnecessarily.

Figure 1:
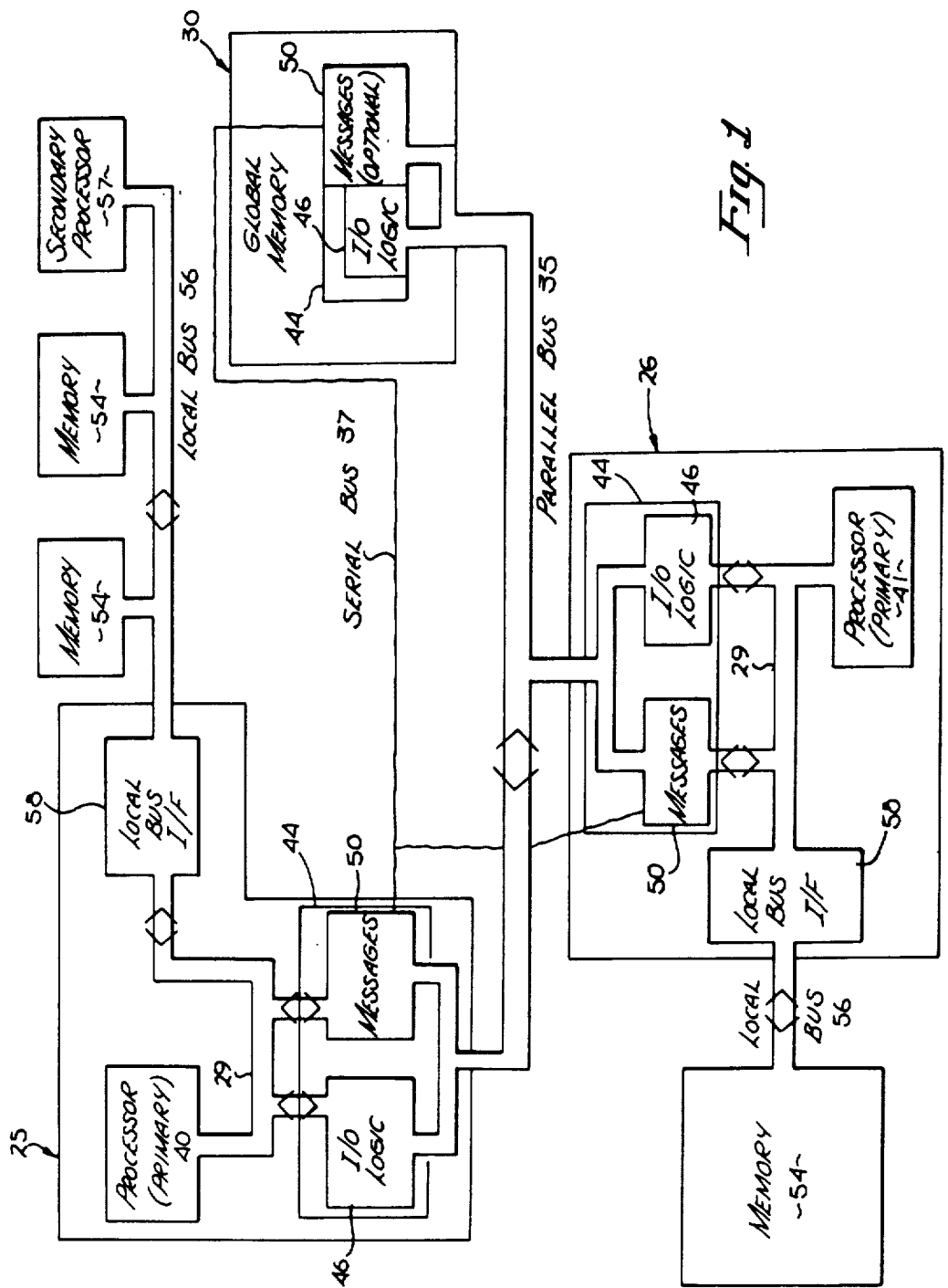
FIG. 1 illustrates a data processing system adapted to implement the teachings of the present invention.

Referring to FIG. 1, the present invention may include a plurality of processing units identified generally by the numerals 25 and 26, as well as peripheral devices such as global memory 30 (or other devices such as for example, printers, disk drives and the like). For purposes of this Specification, all data processing and peripheral devices which are coupled to the bus structure of the present invention are collectively referred to as "agents". As shown, processing units 25, 26 and global memory 30 are interconnected for data transfer to one another by a parallel bus 35 and a serial bus 37. Processing units 25 and 26 each include primary processors 40 and 41 which are coupled to the parallel bus 35 and serial bus 37 through respective bus interfacing units 44, which, as will be described more fully below, include I/O logic 46 and message control logic 50. As illustrated, each processing unit is coupled to local data processing resources such as memories 54, or in the case of processing unit 25 a secondary processor 57 along a local bus 56. Processors 40 and 41 are coupled to their respective local resources, such as a memory 54, through a local bus interface circuit 58.

As will be described, the present invention's bus architecture permits high speed serial message transfer between all agents coupled to the bus as well as high speed data transfer in parallel between agents. Moreover, the present invention's architecture minimizes processor interruption in order to transfer data between bus agents, including access to data stored in local memories 54 which constitute a local resource for each processing unit. In addition, as will be described, data transfer protocols for both the parallel bus 35, and serial bus 37, as well as the local bus 56, have been defined such that minimum handshake sequences are required in order to accomplish data transfer. Although FIG. 1 illustrates only two processor units coupled to the bus, it will be appreciated that the structure of the present invention permits a plurality of processing units and peripheral devices such as memories, disk drives, printers, and the like to be interconnected using one or all of the bus structures identified herein.

Parallel Bus

Figure 3:
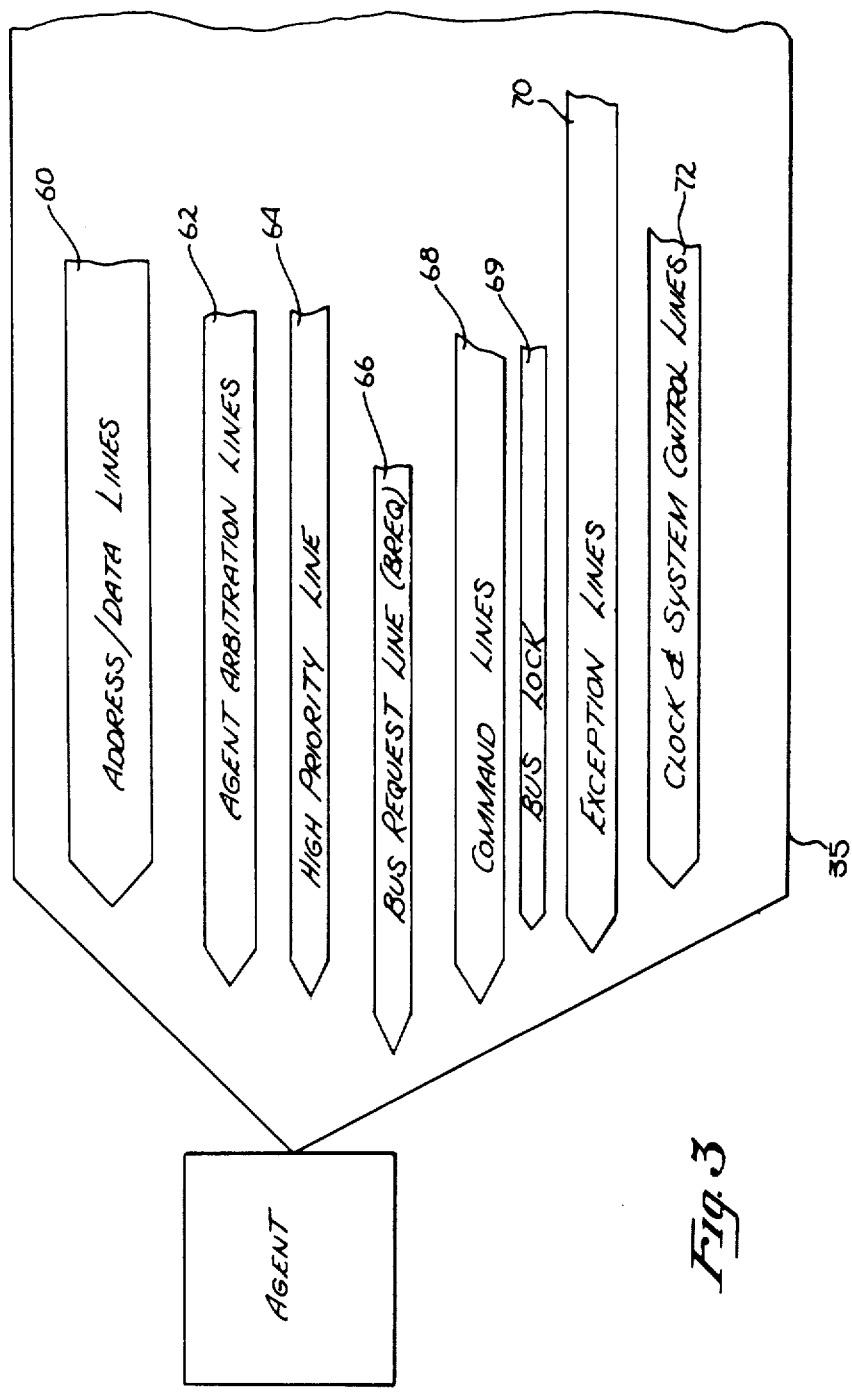
FIG. 3 diagrammatically illustrates the various sub-bus structures comprising the present invention's parallel system bus.

Referring now to FIG. 3, parallel bus 35 includes address/data lines 60 which in the present embodiment comprises thirty-two address data lines (plus four parity lines) onto which address and data are alternately multiplexed. In addition, parallel bus 35 includes an agent arbitration lines 62 to permit each agent coupled to the parallel bus 35 to convey a unique agent arbitration number for bus acquisition, and a high priority line 64, which as will be described, permits an agent to acquire parallel bus ownership irrespective of general arbitration protocol. Bus ownership may be maintained by the assertion of a bus lock signal on bus lock line 69, thereby effectively locking out other agents from bus acquisition. In addition, a bus request line (BREQ) 66 is provided in order to permit agents to request parallel bus control, and a command bus 68 is provided in order to permit processing units 25 and 26 to communicate commands to other bus agents. In order to denote error conditions, exception lines 70 are provided as well as clock and system control lines 72 to allow proper synchronization and control.

Parallel bus 35 supports three types of bus cycles which are initiated upon the request of an agent, such as, for example, processing unit 25, the "arbitration" cycle, the "transfer" cycle and the "exception" cycle. For purposes of this Specification, the arbitration cycle is defined as the parallel bus cycle in which an attempt by an agent is made to gain exclusive control of the parallel bus 35. The arbitration cycle insures that only one requesting agent may perform a data transfer cycle on the parallel bus 35 at any one time. At the close of the arbitration cycle only a single agent (e.g. processing unit 26) may utilize the parallel bus and transmit data to or from another agent. During the process of data transfer, a system error may occur which initiates the exception cycle. All three parallel bus cycles operate together in an overlapped fashion such that other agents may conduct arbitration cycles during an existing transfer cycle in order to determine which agent will have parallel bus ownership next.

Figure 2:
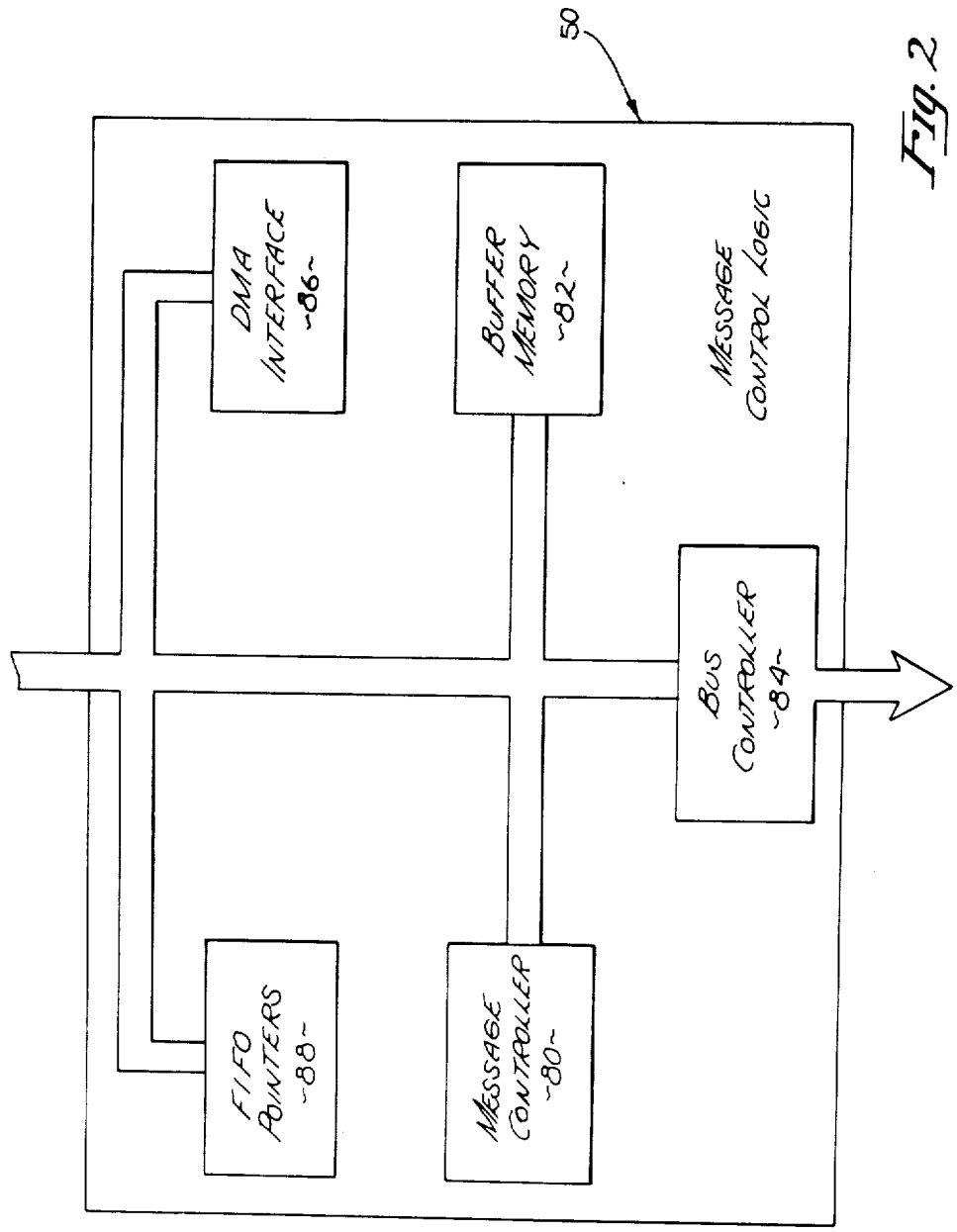
FIG. 2 is a block diagram of major components comprising the present invention's message control logic.

As illustrated in FIG. 2, message control logic 50 includes a message controller 80 which is coupled by a conventional bus to a buffer memory 82, a bus controller 84 as well as a direct memory access (DMA) interface 86, and FIFO pointers 88. Message control logic 50 is responsible for implementing parallel and serial bus protocol, gaining access to the respective buses, and transferring data through DMA interface 86 between other agents coupled to the parallel (as well as serial) bus and memories 54 through local bus 56.

Figure 5A:
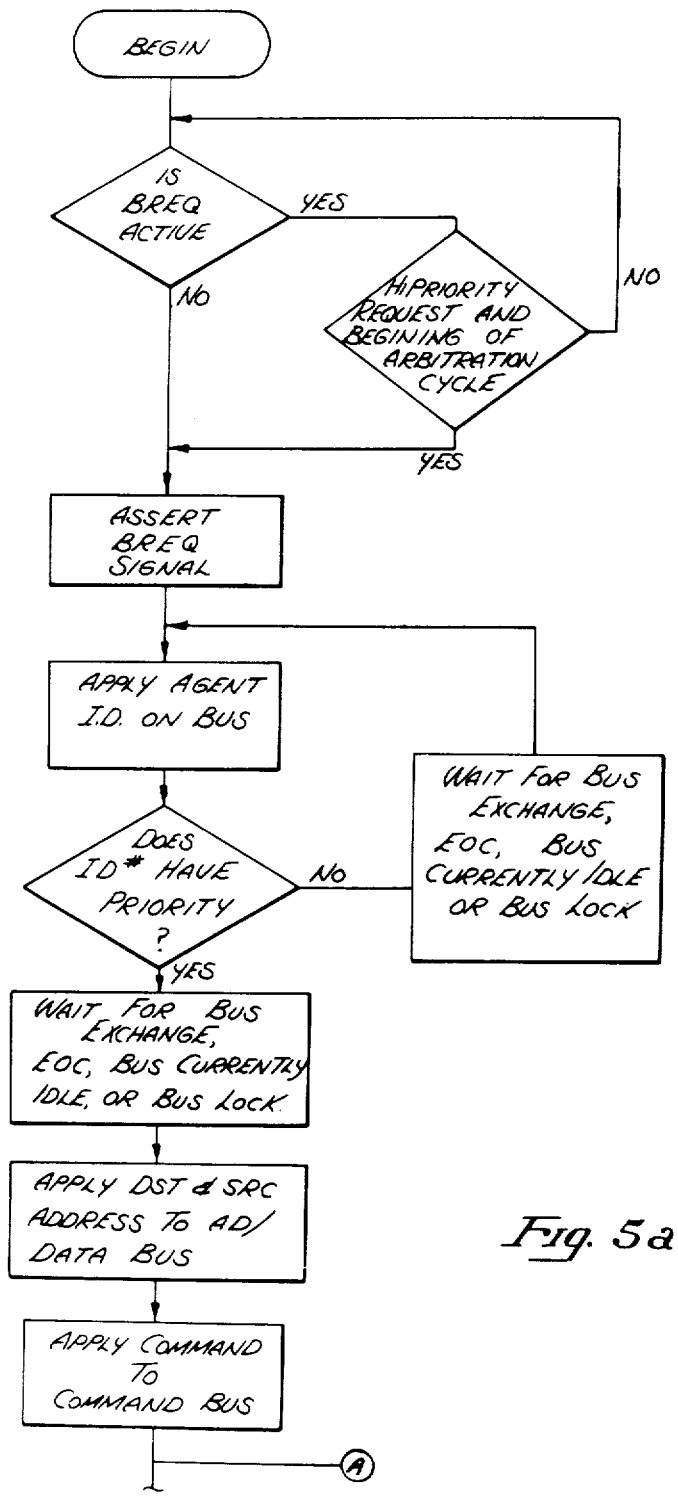
FIGS. 5(a) and 5(b) are a flow chart illustrating the sequence of operations executed by a requesting agent coupled to the parallel bus in order to receive data from a replying agent along the bus.

Assume for sake of example, that processing unit 25 is required to fetch data stored in global memory 30 using parallel bus 35. Processing unit 25, through its bus controller 84, must first gain access to the parallel bus 35 by initiating an arbitration cycle. As best shown in the flow chart of FIGS. 5(a) and (b), bus controller 84 within the processing unit 25 first determines whether or not the bus request (BREQ) line 66 is currently asserted. Assuming processing unit 25 does not have a high priority request, it must wait until the BREQ line 66 is not asserted before entering the resolution phase of the arbitration cycle. If the BREQ line 66 is not asserted, processing unit 25 then asserts the BREQ line 66 and concurrently applies a digital code corresponding to its unique agent arbitration number onto the agent arbitration lines 62 (see FIGS. 4 and 5(a)). Appropriate logic within the bus controller 84 of each agent coupled to the parallel bus 35 selects the arbitration number of the requesting agent which has the highest predetermined priority (assuming the high priority line 64 has not been asserted) within a fixed number of clock cycles after the arbitration cycle has been initiated. If another agent, for example processing unit 26, is concurrently requesting parallel bus acquisitions and the other agent has a higher priority arbitration number, processing unit 25 must wait for an end of cycle signal (EOC) denoting the end of a data exchange or for the bus to become idle. Similarly, if a previous bus owner has asserted the bus lock line 69, all agents coupled to the parallel bus 35 must await the deassertion (unlocking) of the parallel bus prior to gaining access, and repeat the attempt to gain access to the bus by asserting its arbitration number on agent arbitration lines 62.

In the present embodiment, priority among agents coupled to the parallel bus 35 is determined by their respective arbitration numbers. Each agent is coupled to a position ("slot") on the bus 35, and a dedicated "T" pin line is coupled to each slot position. At power-up, each agent is provided with an agent slot identification number, as well as a unique arbitration number, by a central service module (CSM) which is coupled to the bus (not shown). The central service module applies an agent slot identification number to the agent arbitration lines 62 and drives low the T pin line correspondinng to the agent with whom the slot identification number is to be associated. The driving of the T pin line low latches the slot identification number into registers within the agent. Similarly, the CSM applies a unique arbitration number to the agent arbitration lines 62 and drives the T pin line low corresponding to the agent with whom the arbitration number is to be associated. The driving of the T pin line high latches the arbitration number. In the present embodiment, the state of one arbitration line 62 denotes whether the number asserted on the remaining arbitration lines corresponds to an agent slot number or arbitration number. This process is repeated until all agents have been allocated their respective slot identification and arbitration numbers. It will be apparent to one skilled in the art that various other priority hierarchies may be defined between agents such as processing units 25 and 26.

Assuming that processing unit 25 has gained bus ownership (by having priority through its arbitration number), processing unit 25 becomes the bus owner and retains the bus even after the transfer is completed as long as the BREQ signal remains deasserted. Upon detecting an EOC signal or if the bus is currently idle, processing unit 25 applies a digital code corresponding to the address of the replier agent (destination address), as well as the address of processing unit 25 (source address) if the data comprises a message, to the address/data bus. Concurrently, processing unit 25 applies a digital code corresponding to the particular function to be performed by the replying agent (in the present example global memory 30) to the command bus. As shown in FIG. 4, once a requesting agent such as processing unit 25 applies the various address and command codes across parallel bus 35, the command bus lines are effectively split, permitting various acknowledged signals to be transmitted by both the requesting as well as replying agent. The application of the addresses and commands by the requesting agent (processing unit 25 in the present example) completes what is referred to as the "request phase". As shown, the actual request phase lasts only one clock cycle in the presently preferred embodiment.

Figure 5B:
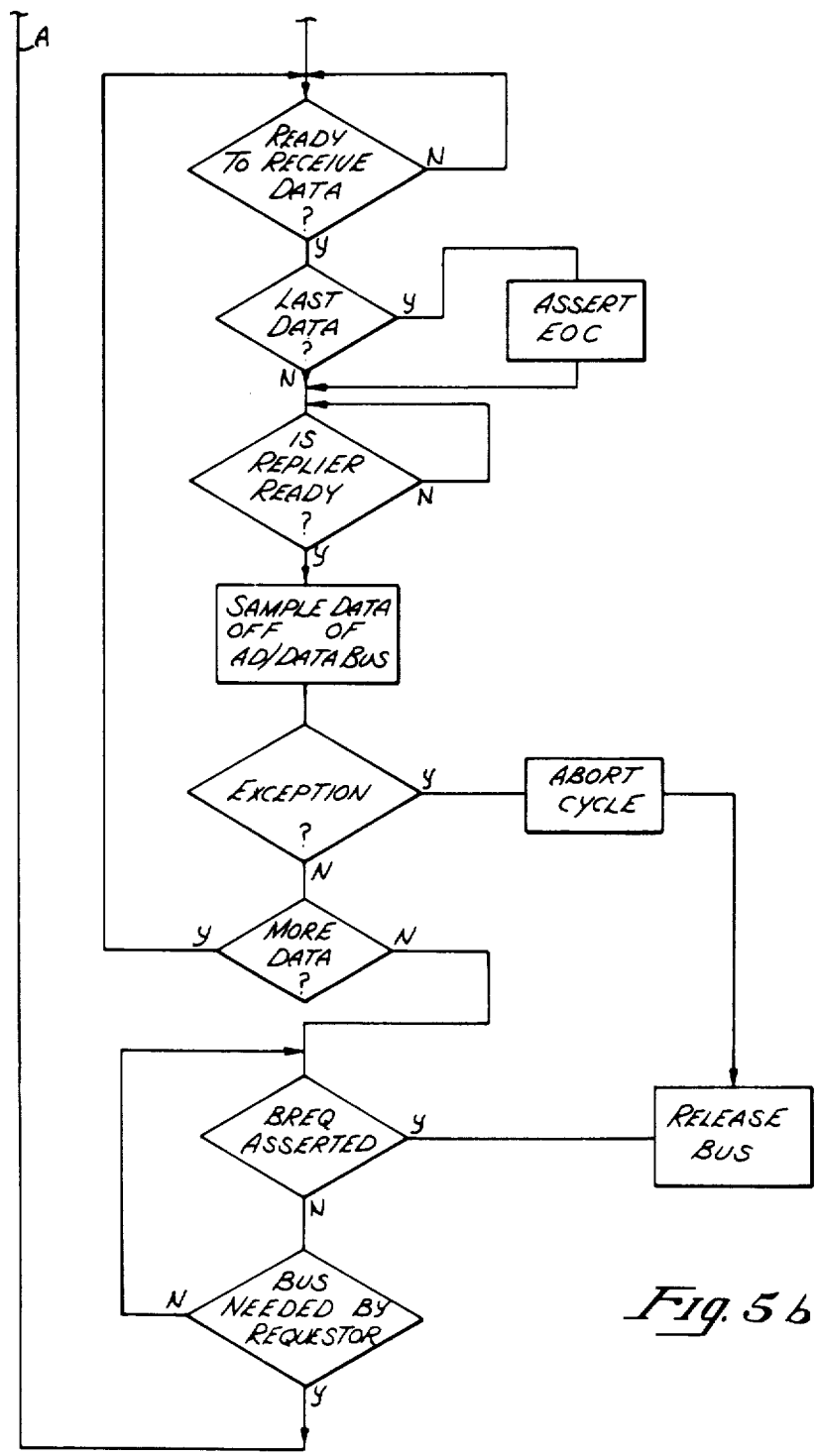
Figure 6:
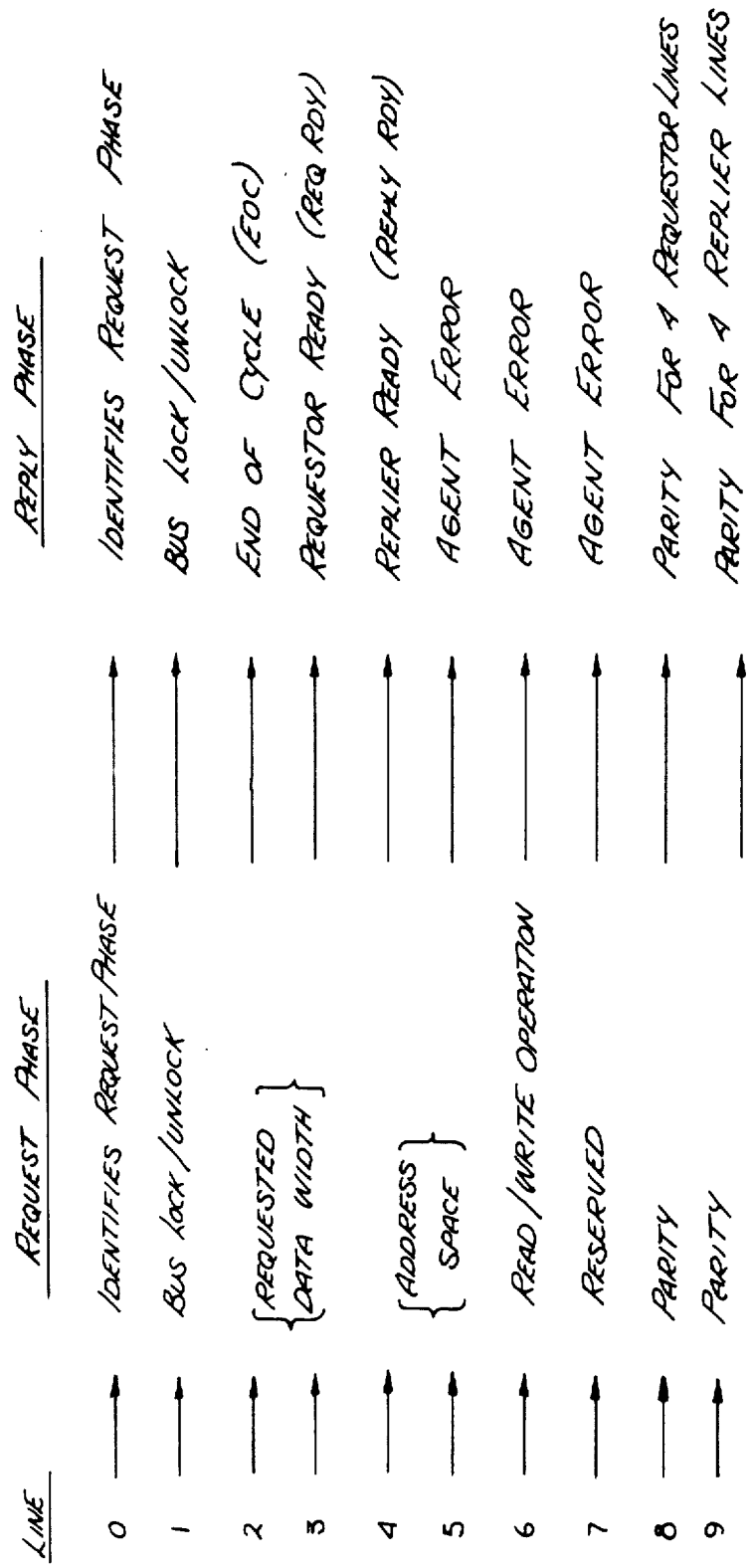
FIG. 6 illustrates the allocation of lines comprising the control bus during both the request and reply phases.

At the close of the request phase, the lines comprising the command bus 68 are reallocated as shown in FIG. 6. Specifically, five command lines are allocated to the requesting agent and five command lines are allocated to the replying agent in order to complete the handshake required in order to transfer data between agents. In particular, the requesting agent (processing unit 25 in the present example) asserts a requester ready (REQ RDY) signal on an appropriate command line thereby indicating to the replier that the requesting agent is prepared to accept data on the address/data bus 60. Similarly, the replying agent (in the present example global memory 30) asserts a replier ready (REPLY RDY) signal (see FIG. 7) indicating to the requesting agent that data on address data bus 60 is valid and may be accepted. Thus, the protocol of the parallel bus 35 requires the assertion of both the replier and requester ready signals before data on address/data bus 60 is considered valid and latched. Additional data packets may be transmitted between the requesting and replying agents on parallel bus 35 by the subsequent deassertion of the replier ready and requester ready signals and their reassertion as illustrated in FIG. 4. As illustrated, if no further data transmission is to occur, the requesting agent (in the present case processing unit 25) asserts an end of cycle (EOC) signal concurrent with the assertion of the REQ RDY signal. The generation and transmission of the EOC signal notifies other agents coupled to parallel bus 35 of the end of the current transfer cycle such that bus ownership may be transferred. As best shown in FIG. 5(b), once valid data is sampled a replying agent (in the present example global memory 30) may signal the requesting agent of a data transfer error (an "exception") during its portion of the handshake normally denoted by a replier ready signal. Any data transfer cycle error detected during this period by the requesting agent (in this case processing unit 25) forces the assertion of an EOC signal on the next clock cycle, thereby aborting further data transfers and releasing bus ownership to any waiting agents who have successfully completed the arbitration cycle previously discussed.

Although the previous example and discussion illustrated a data transfer from a replying agent to a requesting agent coupled to the parallel bus 35, it will be appreciated that a data transfer from a requesting agent (e.g. processing unit 26) to a replying agent (e.g. processing unit 25) follows the substantially identical protocol as disclosed in FIG. 4, inasmuch as the present invention's parallel bus protocol simply requires the assertion of both the REQ RDY and REPLY RDY signals prior to latching data off of the parallel bus. Therefore, the present invention permits the relative operational speed of the requesting and replying agents to differ but utilize the same transfer protocol.

The present invention's message control logic 50 permits numerous message and data transfers between agents coupled to the parallel bus 35 (and as will be discussed, the serial bus 37) with minimal interruption of the primary processors within processing units. For example, data may be transferred to local processor 40 memory, or alternatively to and from a dedicated resource memory 54 without the necessity of interrupting the primary processor 40. As will be decribed, message controller 80 within the message control logic 50 examines message addresses passing within data packets along the parallel bus 35 as well as serial bus 37 in order to determine if the particular agent is to be involved in the message transfer operation. If a particular message controller is addressed, it examines the Type field contained within the message packet and generates any necessary interrupt required to the primary processor. Alternatively, if an interrupt is not required, appropriate information is then transferred to the direct memory access (DMA) interface 86 to permit resource memories 54 to be accessed by an external requesting agent.

Figure 7:
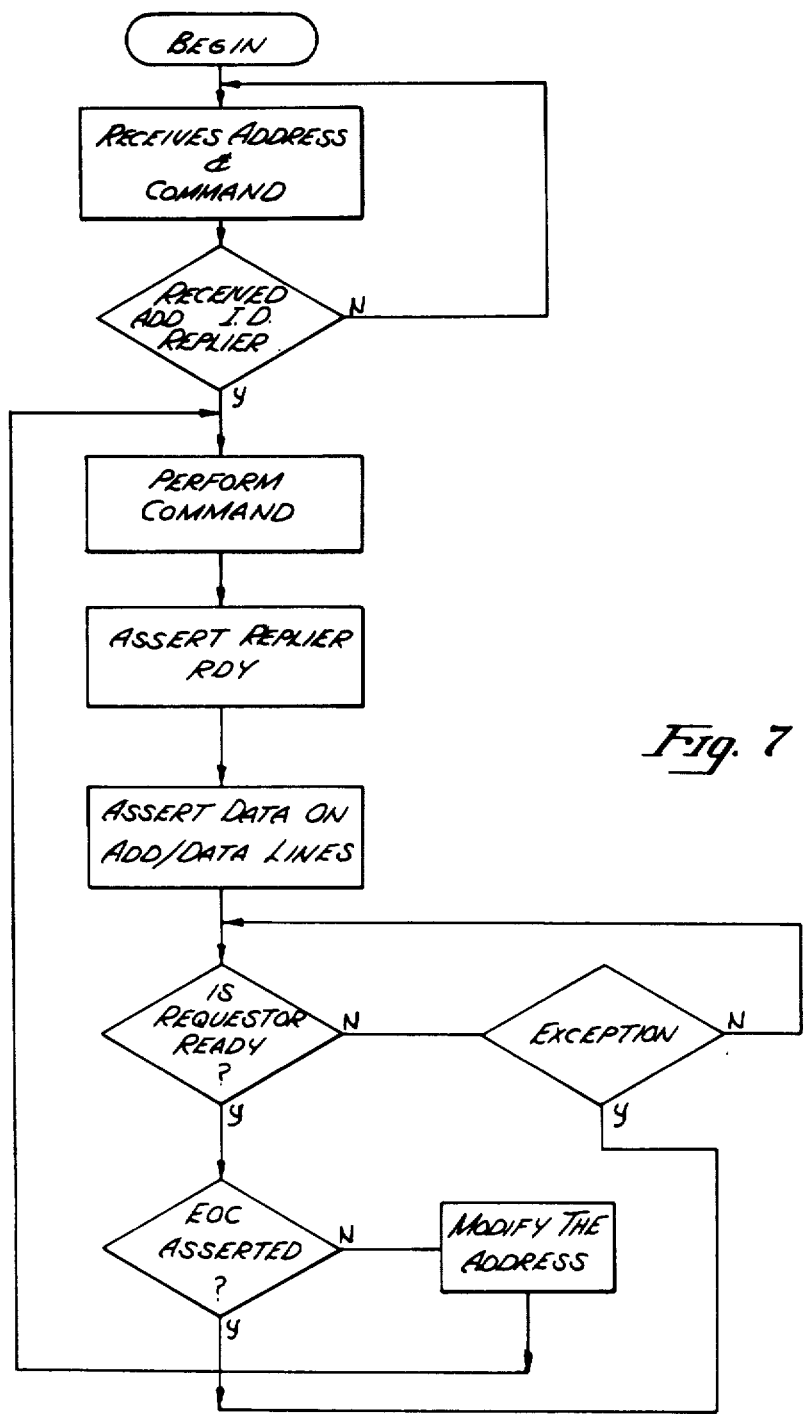
FIG. 7 is a flow chart illustrating the sequence of logical operations executed by a replying agent coupled to the parallel bus in order to transfer data to a requesting agent.
Figure 8:
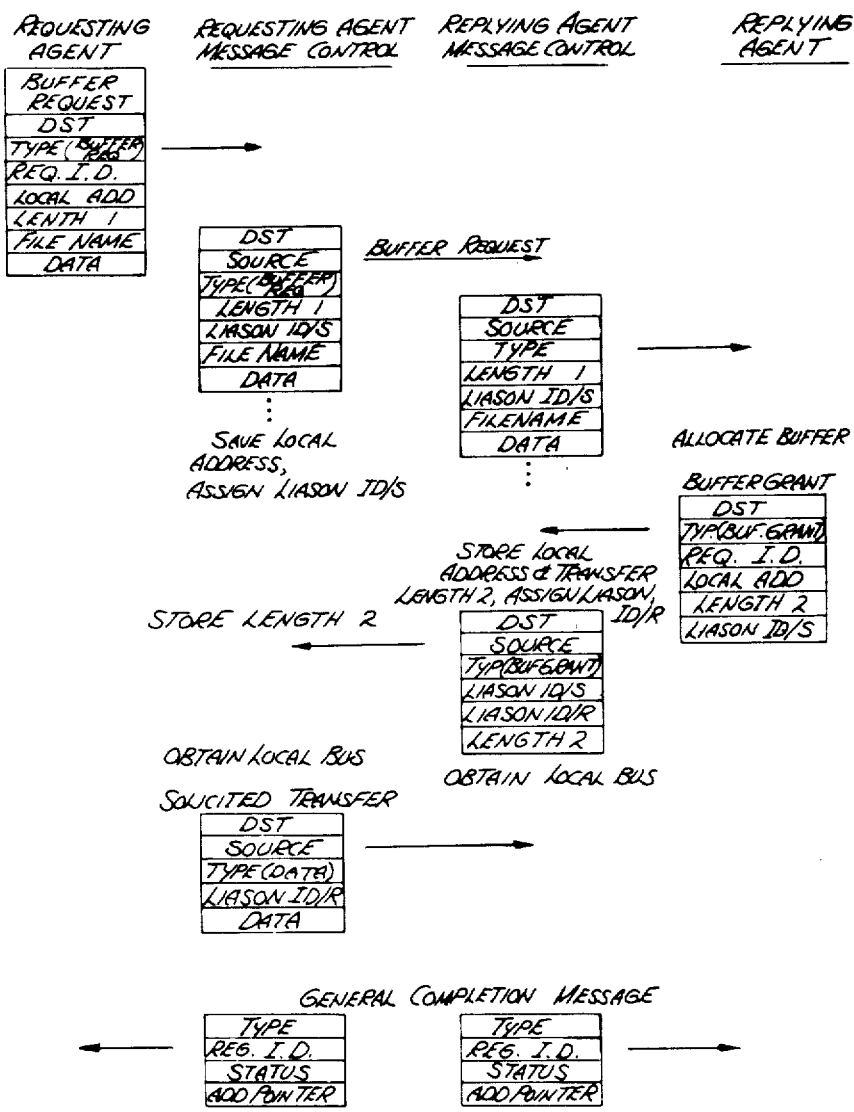
FIG. 8 diagrammatically illustrates a solicited message transfer along the parallel bus.

Referring now to FIG. 7, the message transfer operations utilizing message control logic 50 are disclosed. Assume, for sake of example that primary processor 41 within processing unit 26 desires to transfer data to memory directly accessible by the processing unit 25. The requesting agent (processing unit 26) issues a "Buffer Request" to its message controller 80, which as shown, includes a destination byte corresponding to the destination replying agent's address, a command "Type" byte corresponding to a particular operation requested (in this case a write data operation), an identification byte, corresponding to the unique identification number of the requesting agent, a byte denoting the local data address where the data is stored for access by the requesting agent, an optional file name, as well as a length byte and finally any data (if data is to be tranferred). These message bytes are passed along the local internal bus 29 to the message control logic 50 of the requesting agent. The message controller 80 of the particular requesting agent (in this example, processing unit 26) stores the local address and length information within buffer memory 82 or DMA 86 of the message control logic 50. Message controller 80 additionally adds a byte to the request packet which includes a unique liason transfer number (ID/S) which identifies the current request. Message controller 80 passes the buffer request packet through bus controller 84 onto the parallel bus using the data transfer protocol previously discussed with reference to FIGS. 4, 5(a), 5(b), 6 and 7 to the replying agent (in this case, processing unit 25). The replying agent's message control logic 50 transparently passes the request to the primary processor 40 of the replying processing unit 25. Upon receiving the message the primary processor 40 of the processing unit 25 determines whether or not an appropriate memory buffer may be allocated having sufficient length as defined by the length byte "length$_1$". Once the primary processor 40 has allocated the requested memory space, a buffer grant message is generated wherein the Type byte corresponds to a unique code identifying a buffer grant. In addition, the local replying agent's address location is specified along with the allocated buffer length ("length$_2$") which indicates the memory size with the replying agent has actually allocated. This allocated memory size may differ from the memory size requested by the requesting agent. Finally, the byte denoting the liason transfer identification number (ID/S) is repeated which uniquely identifies the particular buffer request. The buffer grant data packet is then transferred along the local internal bus 29 to the replying agent message control 80 which stores the local address of the buffer as well as the transfer liason ID/S number and length$_2$ in DMA 86, and as shown, adds the liason transfer (ID/R) requester number to the generated buffer request packet. The buffer grant message is transferred to the requesting agent's message control logic unit 50 which then, through the use of DMA interface 86, may fetch data to be transferred to the replying agent and pass such data to the bus controller 84 for transmittal to the replying agent in accordance with the protocol previously discussed and illustrated in FIGS. 4, 5, 6 and 7. The data transfer may consist of one or more data packets as shown in FIG. 8.

Once the desired data transfer has been completed, each respective message controller 80 for both agents generates a general completion message thereby notifying the requesting and replying agent's primary processors that the transfer has been completed. Accordingly, both messages as well as data may be transferred between agents coupled to the bus structure of the present invention with minimum interruption of primary processor operations and may include direct memory access for data transfers controlled by the message control logic 50. It will be noted that the above described message transfer operations illustrated in FIG. 8 are also utilized by the serial bus 37.

Serial Bus

Figure 9:
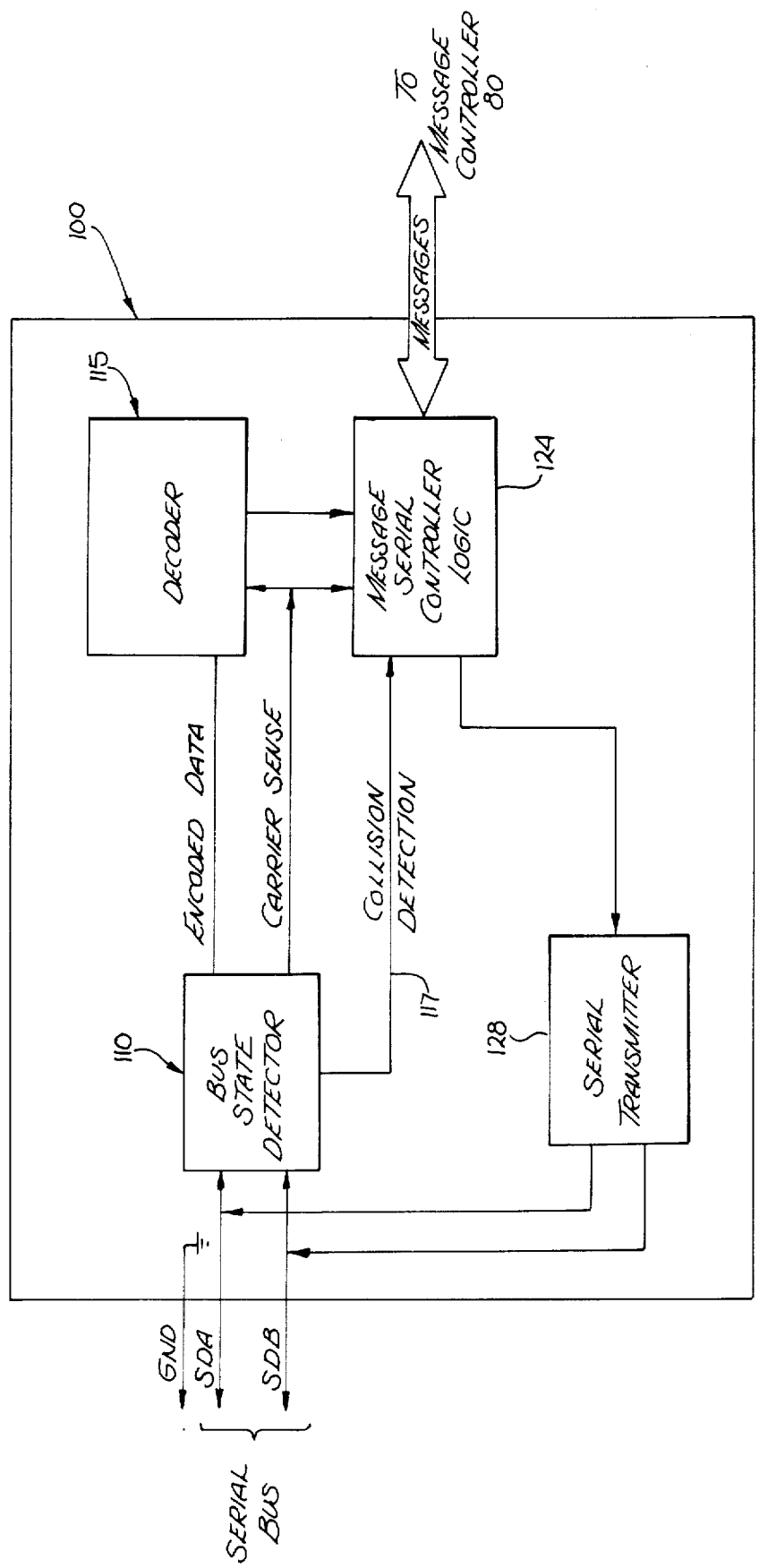
FIG. 9 is a block diagram of the primary components comprising the serial message controller for transmitting messages along the present invention's serial bus.

As previously discussed with reference to FIG. 1, each agent within the present invention's bus structure may be coupled by a serial bus 37 as well as, or instead of, the previously described parallel bus 35. While the structure and operation of the parallel bus 35 is primarily designed for large high speed data transfer between agents coupled to the parallel bus, the serial bus of the present invention is primarily designed for high speed and efficient message transfers between bus agents. In the present embodiment, serial bus 37 comprises a three wire serial link having lines identified as "SDA", "SDB" and "Ground" (see FIG. 9). The Ground line provides a common reference for all devices as well as providing a measure of noise immunity for the data lines SDA and SDB. As illustrated in FIG. 9, message controller 80 within the message control logic 50 of each agent includes a serial message controller 100 for transmitting and receiving serial data along the serial bus 37 from various agents. Both lines of the serial bus 37 as well as the ground are coupled to a bus state detector 110 which provides three basic signal outputs. Encoded data received from the serial bus 37 is passed to a decoder 115 along with a signal denoting a carrier sense signal. As will be described more fully below, bus state detector 110 further determines whether or not a collision has occurred between messages passing along serial bus 37. A collision detection line 117 is coupled from the bus state detector 110 to serial message controller logic 124 which, as will be described, controls the present invention's collision retransmit arbitration cycle. A serial transmitter 128 is coupled to the controller logic 124 and each serial line SDA and SDB in order to permit messages to be transmitted along the serial bus 37. As illustrated, messages to be transmitted serially along serial bus 37 are first coupled to controller logic 124 along internal message control lines (not shown) coupled directly to other message controller 80 circuitry within the message control logic block 50 shown in FIG. 2.

Figures 23, 24:
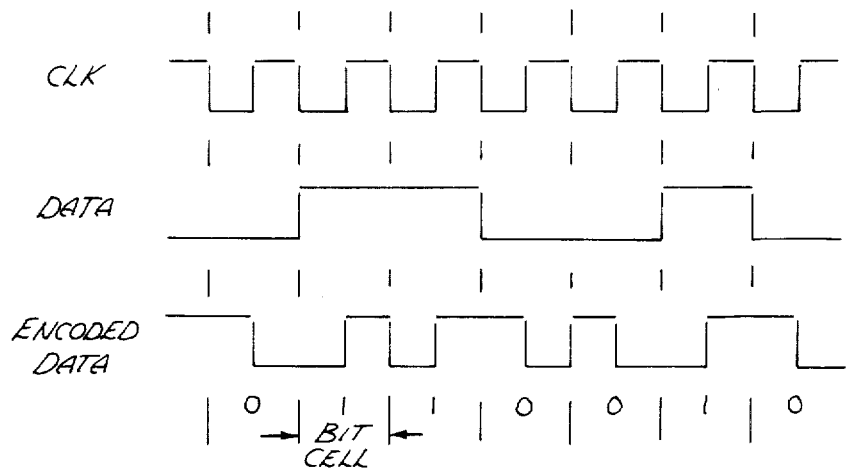
FIG. 23 is a timing diagram illustrating the present invention's use of Manchester encoding.
FIG. 24 illustrates the possible logical states of the serial bus and their respective operations.

Data which is transmitted along the serial bus 37 is driven on lines SDA and SDB 180 degrees out of phase when valid data exists. In the presently preferred embodiment, the drivers for the data lines SDA and SDB are open collection devices which offer a bit transfer rate of 2M bits per second at a 20 Mhz sampling rate. Moreover, serial message controller logic 124 encodes messages to be transmitted using, in the present embodiment, well known Manchester encoding techniques. This technique combines clock and data signals into a common signal as shown in FIG. 23. Note that there is at least one transition per bit cell for the message controller's (124) phase locked loop to synchronize on.

Figure 10:
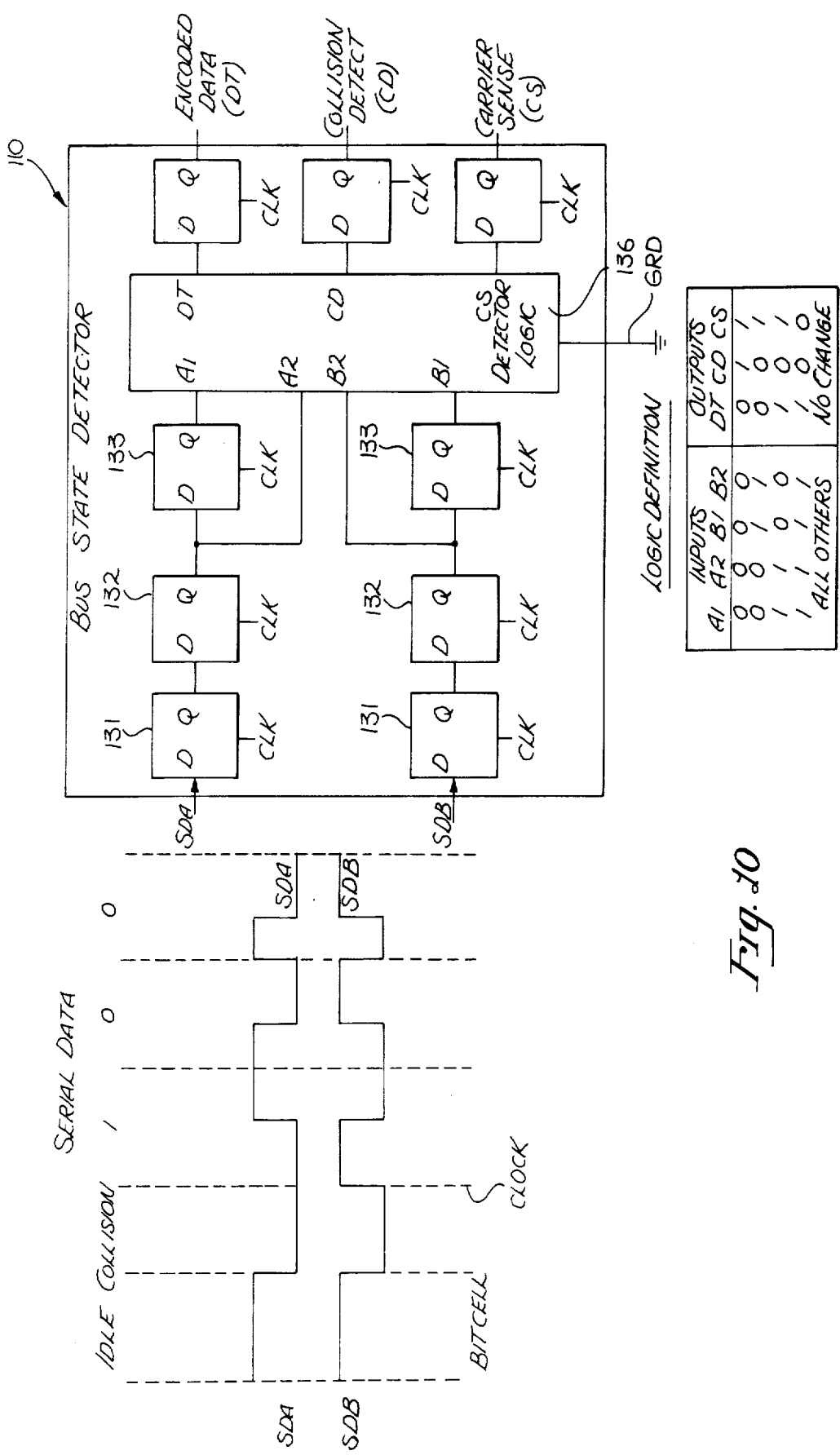
FIG. 10 is a schematic illustrating the bus state detector circuit of the serial message controller.

Referring now to FIG. 10, bus state detector 110 generates encoded data, collision detect and carrier sense signals from received serial transmissions. Bus state detector 110 includes optional "D"-latches 131 (for synchronization) which are serially coupled to a pair of similar latches 132, as shown. A third pair of D-latches 133 are in turn coupled to the output of the respective latches 132 and to a detector logic circuit 136, as illustrated in FIG. 10. The output of the D-latches 132 for both lines SDA and SDB are coupled to inputs of detector logic circuit 136 identified as A2 and B2 in the FIG. 10. Similarly, the output of D-latches 133 are coupled to inputs A1 and B1 of detector logic circuit 136. All latches are clocked simultaneously by a clock signal, typically 20 MHz, generated from the detector logic circuit 136 or an external clock. The use of the D-latches 131, 132 and 133 permits the comparison of sequential data bits which are concurrently received on lines SDA and SDB.

The present invention's bus state detector 110 provides a simple method for extracting encoded data serially transmitted along serial bus 37 as well as detecting the collisions of messages along the serial bus. As illustrated in FIGS. 10 and 24, the idle state occurs when all the transmitters are off, allowing both lines SDA and SDB to be pulled high by pull-up resistors which are a part of the termination. The valid states occur any time a single transmitter is transmitting. When two or more transmitters begin transmitting a collision state exists. Note that with open collector signals, collision detection (CD) is very simple in the present invention. Complimentary lines are used to limit the skew effects of open collector signals. By providing a similar environment (drive, terminator, loads, signal medium) for both signals, rise times generally track line to line and the fall times also track line to line. Unfortunately, because the rise and fall times are different, it is highly probable that the signals will pass through an incorrect state during a valid transition. In addition, due to environmental causes, some ringing and noise may occur. To account for noise, transition, and ringing, the present invention uses a filtering algorithm that requires two consecutive samples to be identical prior to changing state. This controls the effects of transients. Pulse symmetry is also maintained by using complimentary drivers driving the two valid data bits 180 degrees out of phase relative to one another. Because of the characteristic impedance of a transmission line, signal rise times will be different from signal fall times. This can cause asymmetrical pulse shapes if single ended transmission lines are used. With complimentary drivers and receivers, the pulses, if symmetrical when applied to the drivers, will be symmetrical after passing through the receivers.

The link interface of the present invention is responsible for recognizing collisions, jamming the line after collisions are detected, and providing the backoff algorithm. Presently, the bit transfer rate is 2 Mhz and the bit sample rate is 20 Mhz. The serial bus 37 is asynchronous and two bit samples are required to establish valid data. As long as the two driver outputs are not skewed by more than the reciprocal of the sample rate (e.g., 50 nano seconds), no ambiguous collision detections will occur. Sampling twice per bit serves as a low pass filter and protects against false collision detections. Upon detecting a collision, the link interface drives both SDA and SDB low for the jam period, as will be described below.

Figure 11B:
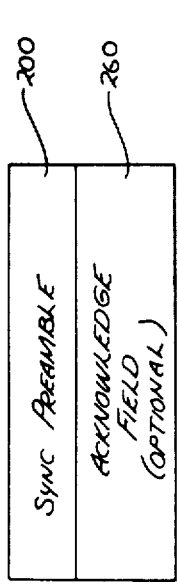
FIG. 11(b) illustrates the acknowledge message structure used in the serial bus for acknowledging a message transfer along the serial bus.
Figure 11A:
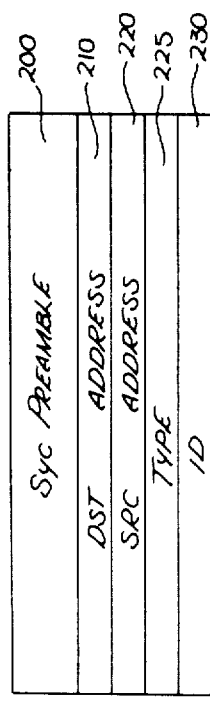
FIG. 11(a) illustrates the present invention's data encapsulation structure for transmitting messages between agents coupled to the bus structure of the present invention.

Referring briefly to FIG. 11(a), all messages transmitted along serial bus 37 contain a synchronization ("sync") preamble 200 required for Manchester encoding, followed by a byte 210 comprising the destination agent address (e.g. processing unit 26). In addition, the source agent address 220 is provided to identify the originating agent transmitting the message. A "type" byte 225 identifies the character of the message transmitted between the agents. Examples of type commands would include a buffer request, a buffer grant, and the like. The type byte 225 is followed by an identification (ID) byte 230 corresponding to a unique identification number for the particular transmitting agent and a data field 235. The message is terminated by an error checking CRC (16 bit CCITT) code 240, as is well known, in order to insure error free transmissions along serial bus 37. At the frame level, a message packet on the bus may be viewed as the sequence of bytes depicted in FIGS. 11 and 23. The maximum length of the packet is 36 bytes. The special bit pattern value of 11111111 in the Dest Addr 210 is used to indicate a broadcast message that must be accepted by all nodes.

Each serial message passing along bus 37 between agents is followed by a period of no message transmissions referred to as the "interframe space" (IFS), and which in the presently preferred embodiment, constitutes approximately four byte times. All messages passed along serial bus 37 are acknowledged by the receiving agent using the acknowledgement message format disclosed in FIG. 11(b). As shown, the acknowledgement signal comprises a sync preamble 200 followed by an optional simple acknowledgement field 260 which comprises a unique digital code representing a message acknowledgement signal. In the present system, acknowledgement field 260 is not used, but rather, an acknowledgement is denoted by sync preamble 200, followed by a bus idle period within the interframe space time. If no sync preamble 200 and/or idle period is detected within the IFS time, an error is assumed.

Figure 12A:
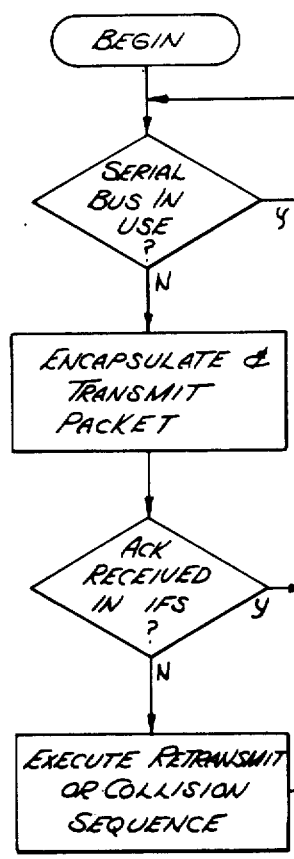
FIG. 12(a) is a flow chart illustrating the sequence of logical operations executed by a transmitting agent along the serial bus of the present invention.

Referring to FIG. 12(a), the sequence of logical operations executed by the message control logic 50 in order to transmit a message along serial bus 37 is described. Assume, for sake of the example, that processing unit 25 must transmit a message to processing unit 26 using serial bus 37. Processing unit 25 first determines whether or not the serial bus 37 is currently in use by examining the carrier sense (CS) output of bus state detector 110. In the present embodiment the absence of data transmissions along serial bus 37 results in both the SDA and SDB lines to remain high (see FIG. 10). A NAND operation by detector logic 136 between lines SDA and SDB would indicate a low state denoting an absence of carrier signal on serial bus 37. Once processing unit 25 determines that serial bus 37 is not in use, serial message controller logic 124 of processing unit 25 encapsulates the message using the message format illustrated in FIG. 11(a) and forwards the message to serial transmitter 128 for assertion on the SDA and SDB lines. Once the processing unit 25 has transmitted its message along the serial bus 37 it awaits the receipt of an acknowledgement message from processing unit 26 during the interframe space following the message using the format illustrated in FIG. 11(b). Assuming that the acknowledgement received within the interframe space, the serial message cycle is now complete.

Figure 12B:
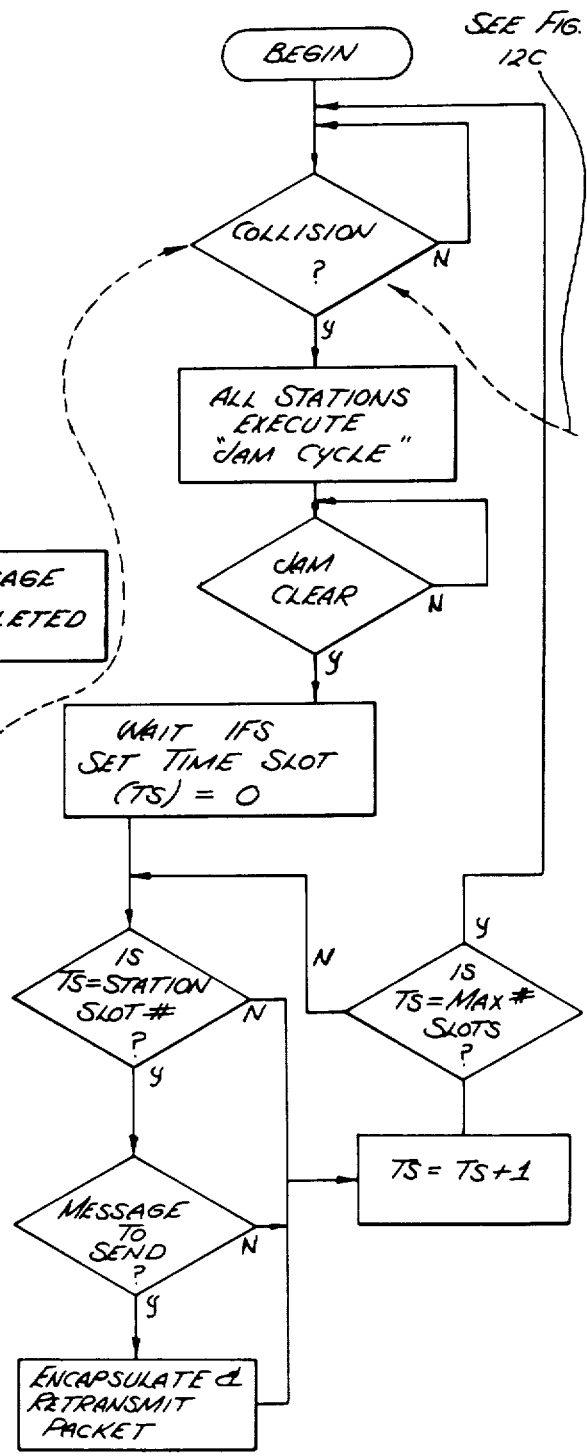
FIG. 12(b) is a flow chart illustrating the sequence of logical operations executed concurrently by agents along the serial bus to detect message collisions.

If processing unit 25 does not receive the acknowledgement message during the interframe space, and the bus state detector 110 has not detected a collision along the serial bus 37 then the processing unit 25 proceeds to repeat the data transmission after setting a flag bit with the message type byte 225 to identify the second transmission as a duplicate message packet. If, however, bus state detector 110 has detected a collision, processing unit 25 (as well as the other agents coupled to the serial bus 37) initiates a serial bus retransmit arbitration cycle which is best illustrated with reference to FIGS. 12(b), (c) and 13.

Due to the nature in which data is transmitted along the serial bus, namely that the data is driven out of phase along lines SDA and SBA, the sum of the colliding messages between one or more transmitting stations will cause both lines SDA and SDB to go low. It will be noted that even in the unlikely event that two agents concurrently transmit identical messages to the same destination agent, a collision would be detected. No "constructive interference" would exist since the same address 220 for each message would differ and therefore the message would not be fully in phase and lines SDA and SDB would go low. In addition, the identity of the transmitting agents could then be determined using the collision resolution operations described below.

Figure 13:
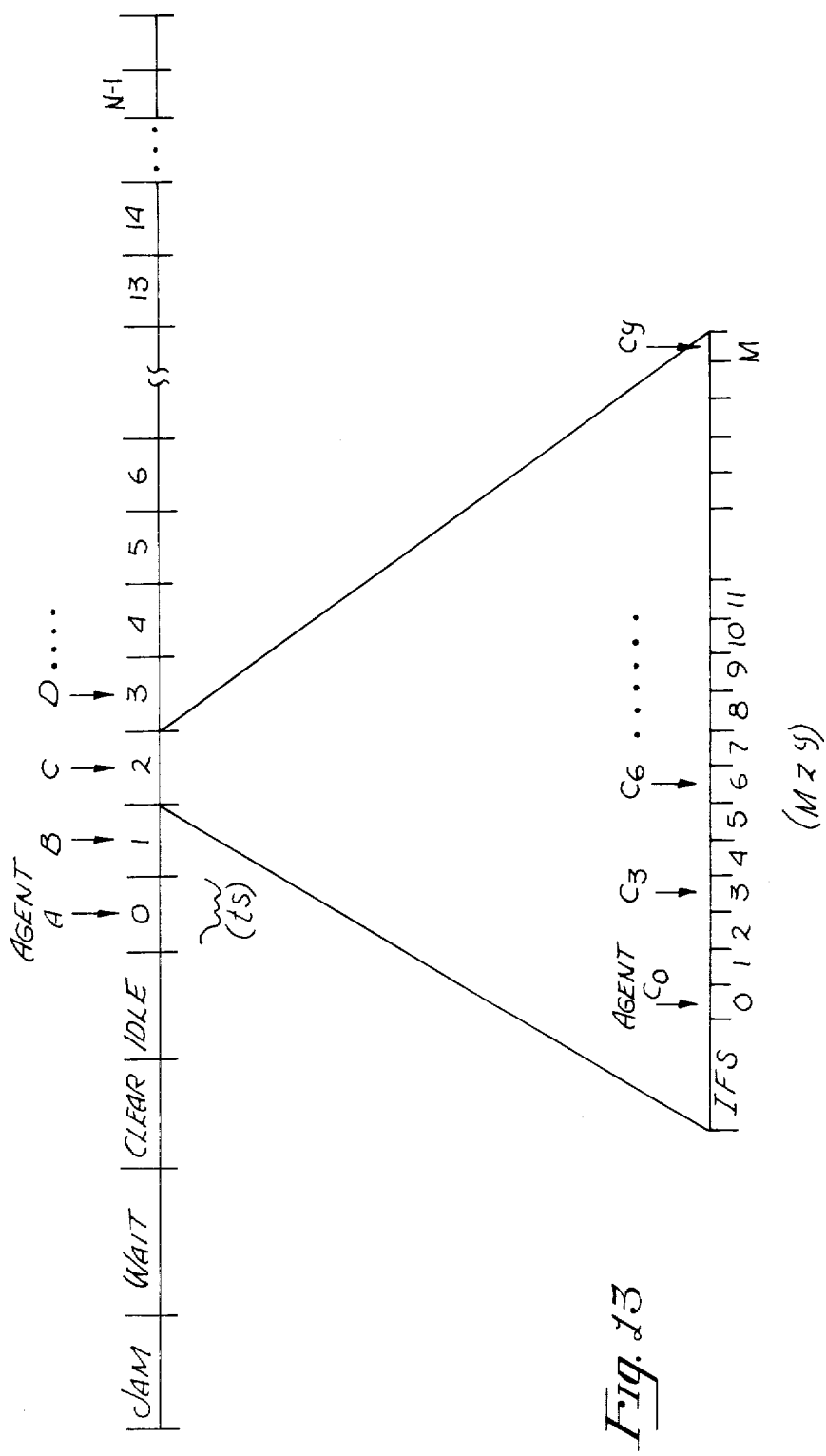
FIG. 13 illustrates the deterministic collision retransmit arbitration cycle used by the serial bus of the present invention.

The present invention resolves the collision in a deterministic manner guaranteeing that no agent will require more than a set maximum amount of time to gain access to the serial bus. All agents on the serial bus must monitor the bus at all times for collisions. Anytime an agent detects a collision, the access control of the present invention switches into a collision resolution mode. Before the collision can be resolved it must be detected, reinforced and cleared. As illustrated in FIG. 13, upon detecting the occurrence of a collision, all agents coupled to serial bus 37 initiate a "JAM cycle" which begins by driving both lines SDA and SDB low to "JAM" the serial bus for a predetermined number of bit times (8 in the present embodiment). The JAM cycle is to reinforce the collision to guarantee that all agents detect the collision. The agents then remain idle monitoring the bus state for a predetermined time to permit the collision to clear. This idle period is the reference for time slot generation to resolve the collision. The agents wait an additional WAIT period [equal to an IFS (8 bit times)] in order to insure that a valid JAM cycle has occurred. After the WAIT period, each agent remains idle for an additional CLEAR period (8 bit times). The CLEAR period is used for resynchronizing all agents when a new agent is brought on-line. The agents wait for an additional time (*8 bit times) termed the IDLE period. Thus, the IDLE period and the WAIT period bracket the CLEAR period to ensure that a transmission is not misinterpreted as bus activity during the CLEAR period.

Once the JAM, WAIT, CLEAR, and IDLE cycles have been completed, each transmitting station simultaneously begins counting through predetermined time slots #0 through #N (as illustrated in FIG. 13). Each agent coupled to serial bus 37 is allocated one of the unique time periods in which to retransmit its message. Each agent uses the most significant 4 bits of its address to determine which of the N time slots is assigned to it. In the presently preferred embodiment, each time slot is 8 bit times.

As illustrated in FIG. 13, each time slot may in turn be divided into a plurality (#0–#M) of sub-time slots wherein each sub-time slot is associated with a particular agent coupled to the serial bus. In such case, upon counting up to a time slot having sub-time slot associated with it, all stations would again initiate a JAM, WAIT, CLEAR and IDLE cycle and begin counting the sub-time slots within the primary time slot (time slot #2 in FIG. 13). As a result, the present invention's transmit arbitration may be efficiently used with numerous agents coupled to the serial bus 37. Although FIG. 13 has illustrated the use of sub-time slots, in the present embodiment only a single level is used such that only one agent is assigned to a particular slot. When the slot number matches the time-slot assigned to the agent, it may transmit. When a time-slot is used by an agent for transmission all agents must halt counting time-slots until the transmitting agent is done. This requires that the agent detect the activity on the serial bus, freeze the time-slot counter and restart counting time-slots at the end of the subsequent interframe space. This is termed "primary collision resolution". After all 16 time-slots are counted down, control returns to the normal CSMA/CD access method. Since more than one agent may be assigned to a time-slot, it is possible to have a collision during primary collision resolution as described above. To resolve this a "secondary collision resolution" level of N secondary time-slots is used. The agents involved in the collision use the four least significant bits of their agent address to determine the time-slot assigned to them in this second level of resolution. After all N time-slots have expired, counting of the primary slots resumes. Normally, a collision is not expected at this stage as a collision can only be caused by a new station coming on line.

Figure 12C:
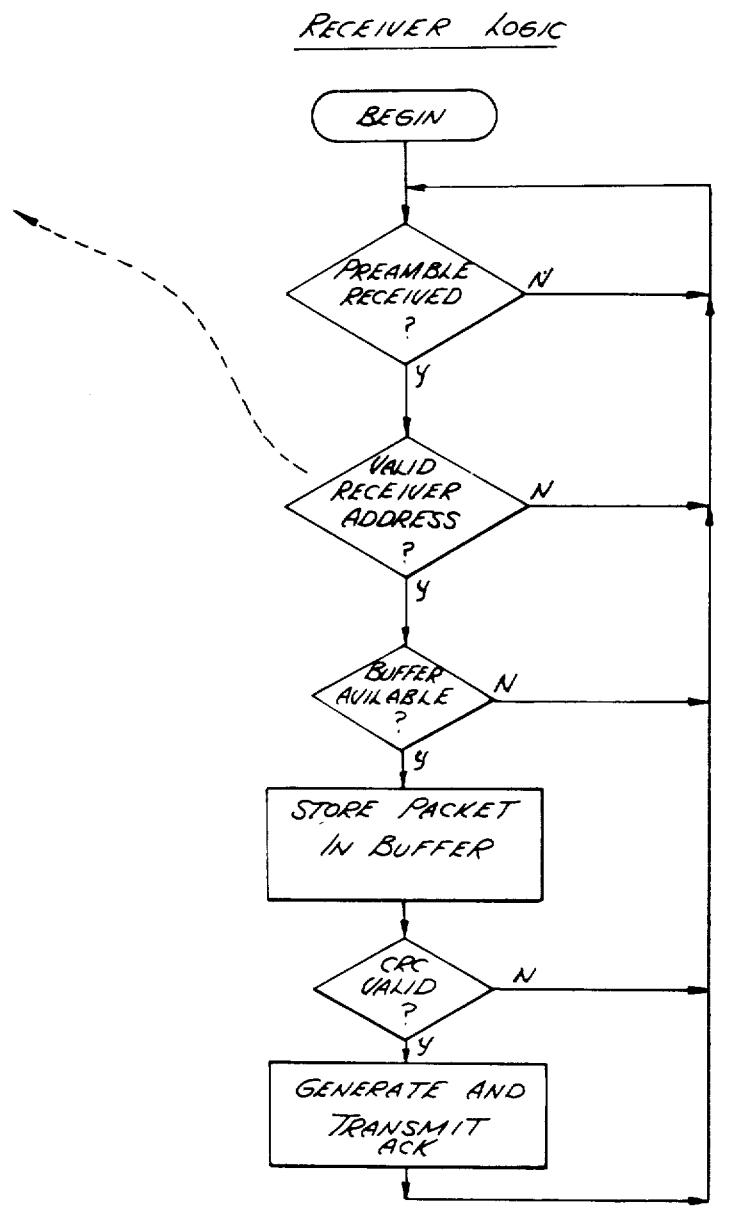
FIG. 12(c) is a flowchart illustrating the sequence of logical operations execute by agents along the serial bus to detect and receive messages.

Assume, for sake of example, that a collision occurred along the serial bus 37 between messages transmitted by an agent "A" and an agent "B". After detecting the collision, all agents coupled to the serial bus 37 proceed through the JAM, WAIT, CLEAR and IDLE cycles and begin the sequential counting of time slots beginning with time slot #0. In the present example, agent A has been allocated time slot #0. Accordingly, all agents coupled to bus 37 cease the counting of time slots until agent A has retransmitted its data message. Once agent A has retransmitted its message using the protocol identified in FIG. 12, all agents once again continue counting time slots beginning with time slot #1. (In the event that sub-time slots have been allocated, as in the case of time slot #2 of FIG. 13, sub-time slots are similarly counted down by all agents after pausing to permit agents who have been allocated the particular sub-time slot to transmit their messages.) Accordingly, the present invention's collision retransmit arbitration protocol is substantially deterministic in that each agent coupled to serial bus 37 is allocated a predetermined time slot in which to retransmit its message. This deterministic approach is fundamentally different than previous CSMA/CD protocols such as for example the "Ethernet" (U.S. Pat. No. 4,063,220) which simply requires all transmitting agents to wait some randomly weighted time prior to retransmission such that one agent will ultimately gain access to the bus.

In the present invention, the following steps ensure that an agent can be connected to the serial bus at any time without compromising data integrity:

1. If the serial bus 37 is in the normal CSMA/CD based access mode and a collision occurs, the new agent will participate with the other agents in the collision resolution process described above.

2. If the serial bus is in the secondary collision resolution mode, the new agent may cause a collision. Collisions are not normally expected at this stage and so all agents on detecting the collision JAM the bus as described above. In addition, they JAM the bus during the CLEAR period described above. On sensing bus acitivity during the CLEAR period all agents including the new one, reset their slot counters and start a primary collision resolution cycle.

3. Collisions are also normally not expected in the interframe spacing (IFS). If a collision is detected then it can only be due to a new agent coming on-line. All other agents force a JAM to reinforce the collision and also JAM the serial bus during the following CLEAR period so that all agents start a new primary collision resolution cycle.

The present invention provides facilities for the transfer of intelligent interrupt messages. These messages are termed "unsolicited" messages. Also provided is a mechanism for bulk data transfer between nodes, referred to as "solicited" messages. Solicited message transfers are performed as sequences of packets. This ensures that the serial bus is never busy for more than a packet time and guarantees quick bus access times for unsolicited messages. Unsolicited messages are used by one node to signal another (i.e. similar to an interrupt). They are considered intelligent in that these messages carry a short data field thereby eliminating the need, in many cases, for additional message traffic on the serial bus to determine the nature of the interrupt. Unsolicited messages are characterized by their unpredictable arrival patterns, their need for a bounded access time to the serial bus, and that they have a short bounded length. An unsolicited message is encapsulated in a single packet.

Solicited messages are used by the present invention to move large blocks of data between agents. Solicited messages differ significantly from unsolicited messages in their general characteristics. They may be relatively long and have a great range of lengths (versus a bounded short length). Their transfer is negotiable so that resources for performing their transfer may be assigned ahead. Accordingly, their need for bus bandwidth is significant. Solicited messages can be divided into three basic phases: negotiation, data transfer and completion. The negotiation phase of the solicited transfer requires the exchange of two special packets between the sending and receiving nodes. The solicited transfer is initiated by the sending agent transmitting a Buffer Request message to the receiving agent [see FIG. 11(a)]. The Buffer Request packet contains a type field 225 to distinguish it from other packets. It also contains the length of the transfer being negotiated. The sending agent assigns a unique Sender Liaison ID 230 to identify this transfer and saves the length of the transfer by associating it with this liaison ID 230. The use of a liaison ID allows an agent to participate in multiple concurrent solicited (output) transfers. The receiving agent recognizes the Buffer Request packet and allocates a receive buffer of the desired length. It then allocates a unique Receiver Liaison ID to identify this solicited transfer and saves the address of the allocated buffer under this ID. This use of a liaison ID allows an agent to participate in multiple concurrent solicited (input) transfers. The receiving agent then transmits a Buffer Grant packet to the sending agent. Upon receiving a Buffer Grant packet, the sending agent checks for a sender liaison ID match. The sending agent then begins the data transfer phase.

Once a Buffer Grant is received, the sending aent begins sending Data Packets. These packets include the Receiver Liaison ID issued in the corresponding Buffer Grant packet to enable the receiving agent to retrieve the correct buffer address. The last data packet has a special type field to mark it as such. The receiving agent frees the Receiver Liaison ID used for the transfer when this last packet is received. The sending agent then frees its Sender Liaison ID on transmitting the last data packet.

In accordance with the previous discussion, it will be apparent to one skilled in the art that the present invention provides a unique serial bus architecture and data transfer protocols not previously known in the prior art. The present invention's serial bus 37 permits efficient message transferring capability between agents within the bus structure thereby eliminating message passing traffic on the parallel bus 35.

Local Bus

The present invention's local bus 56 provides a high speed, high band-width parallel bus to local memory and processing resources for any primary processor within a processing unit such as 25 and 26, illustrated in FIG. 1. All information transfers performed on the local bus 56 involve a requesting agent or a replying agent. For example, a typical requesting agent would be primary processor 40 or a secondary processor 57 coupled to the local bus 56 for use as a resource of the primary processor 40 in performing data operations. Similarly, a typical replying agent along local bus 56 would be a memory resource 54. Accordingly, local bus 56 permits the use of multiple dedicated data processing resources between the primary processor agent 40, and a secondary processor agent 57 if coupled to the local bus 56. In the presently preferred embodiment, a maximum of two "requesting agents" (processors) may be coupled to the local bus 56 at any one time.

Figure 14:
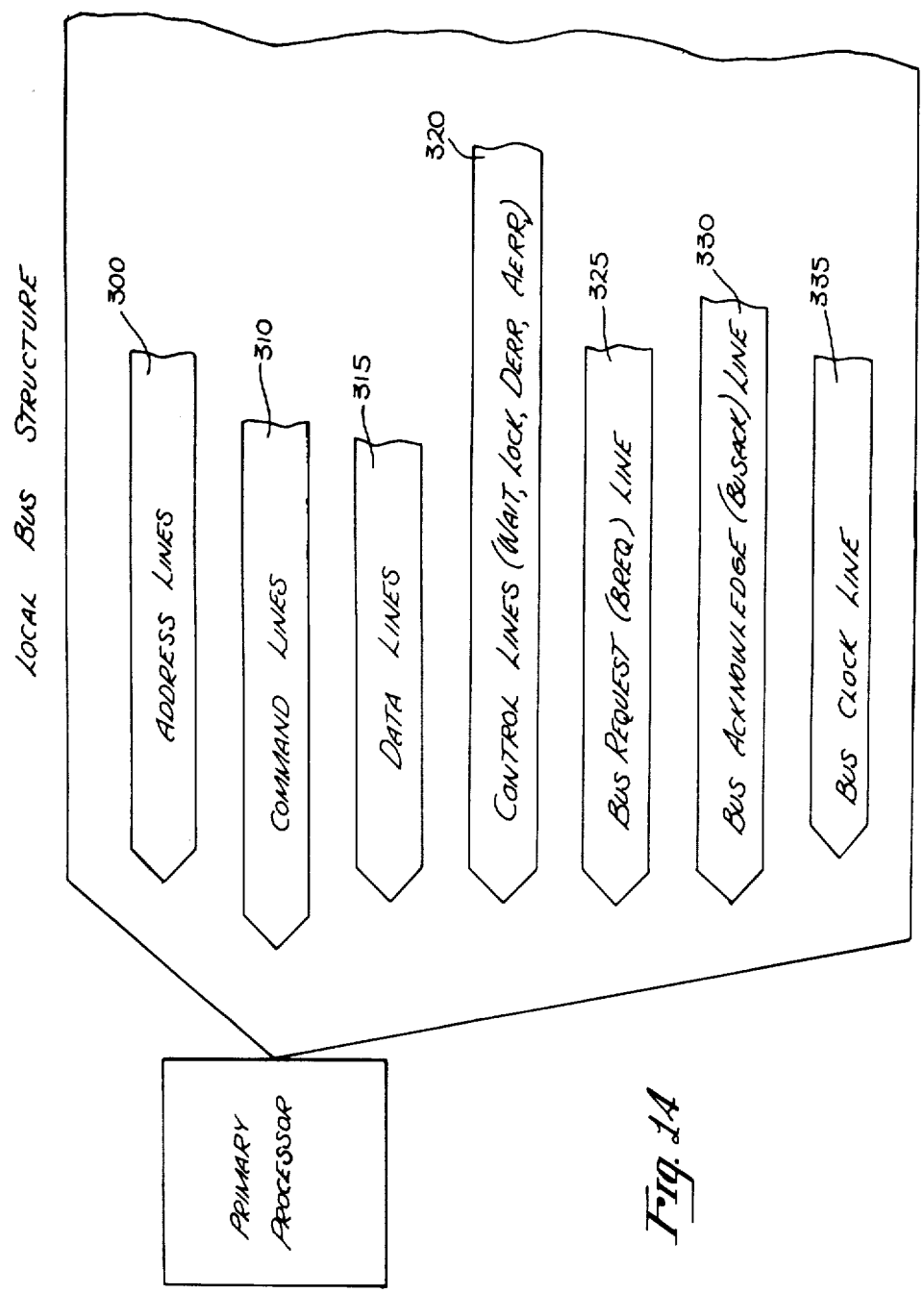
FIG. 14 diagrammatically illustrates the various sub-bus structures comprising the local bus of the present invention.

As illustrated in FIG. 14, local bus 56 includes address lines 300, command lines 310, data lines 315 and a plurality of control lines 320 to maintain system control in accordance with the protocol for local bus 56. A bus request line (BUS REQ) 325 is coupled between the secondary requesting agent 57 and the primary requesting agent 40 (in the case of processing unit 25) through the local bus interface 58 (see FIG. 1). Similarly, a bus acknowledge (BUS ACK) line 330 provides signals between the secondary requesting agent 57 and the primary requesting agent 40 to denote the acknowledgement of a bus ownership transfer. Bus clock line 335 is coupled to the primary requesting agent such that the local bus 56 may be synchronous with the primary processor's internal clock. Accordingly, all bus events are defined in terms of integer multiples of the bus clock's period, and the start and end of each event, or its duration of validity, has a defined relationship to the edge of the bus clock's signal.

All bus data transfer operations consist of three types of events referred to as cycles; the "arbitration" cycle, the "transfer" cycle and the "exception" cycle. The arbitration cycle insures that one and only one requesting agent (either the primary or secondary processor) is allowed to initiate a data transfer along the local bus 56 at any given time. In the present embodiment, the primary requesting agent 40 is given control of the local bus 56 in the absence of a bus request by the secondary requesting agent 57. Accordingly, the primary requesting agent 40 need only enter the arbitration cycle if secondary requesting agent 57 is coupled to the local bus, and where the local bus is currently busy under the secondary requesting agent's control. (Note: that processing unit 26 of FIG. 1 does not incorporate a secondary processor on its local bus such that its primary processor would never have to arbitrate for bus ownership.)

Figure 15:
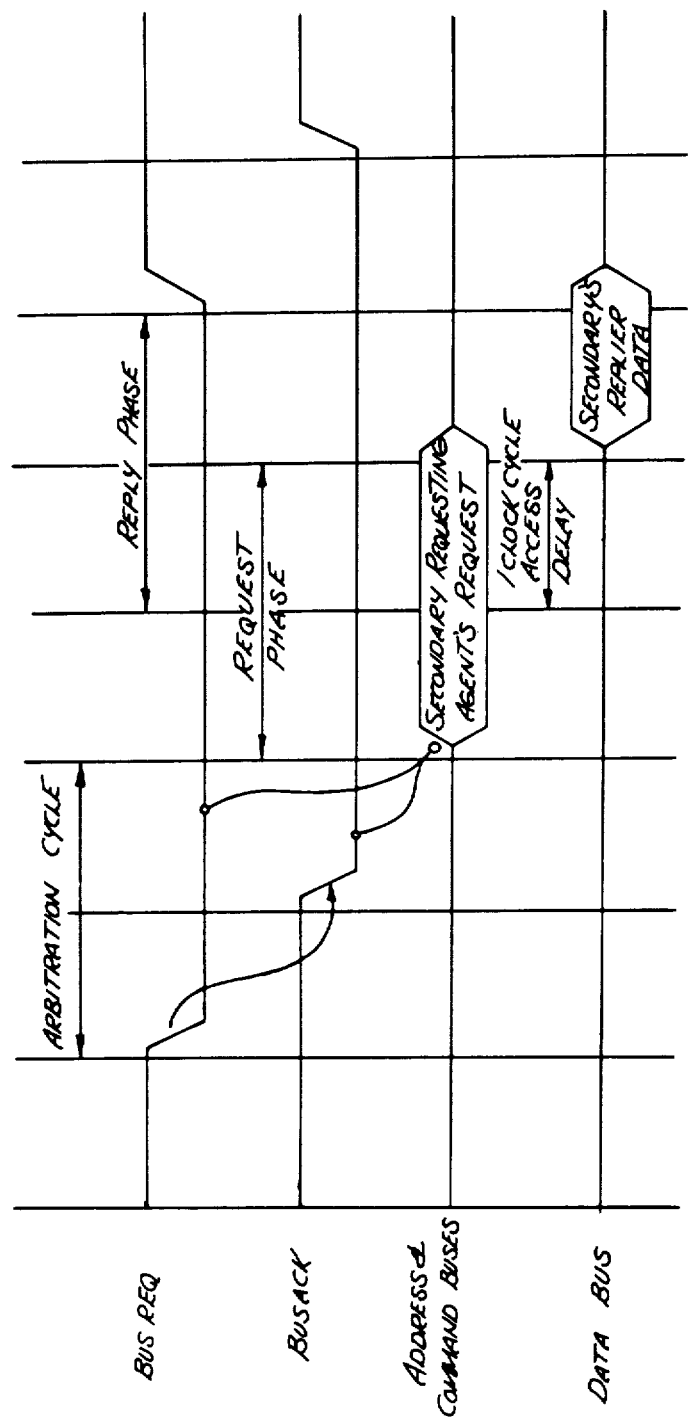
FIG. 15 is a timing diagram illustrating the arbitration cycle for gaining access to the local bus of the present invention.

Referring now to FIG. 15, the present invention's local bus arbitration cycle is illustrated. If the secondary requesting agent 57 requires the use of local bus 56, it asserts a bus request (BUS REQ) signal on the bus request line 325. The primary requesting agent 40 acknowledges the secondary requesting agent's bus request by generating a bus acknowledge (BUS ACK) signal on the bus acknowledge line 330, which effectively transfers bus ownership to the secondary requesting agent 57. Secondary requesting agent 57 may then issue appropriate address and command signals on the address lines 300 and command lines 310 to a local bus resource such as memory 54 in order to initiate the particular bus operation required. The assertion of address and command information by a requesting agent (processor) is referred to as the "request phase", and presently lasts at least two clock cycles. The replying agent (for example a memory resource 54) may then assert appropriate data (in the event of a "read" operation) on the data lines 315 for receipt by the secondary requesting agent 57, using the protocols which will be described. The secondary requesting agent 57, upon completion of the requested operation by the replying agent, deasserts the bus request line 325 thereby surrendering bus ownership back to the primary requesting agent 40.

Figure 16:
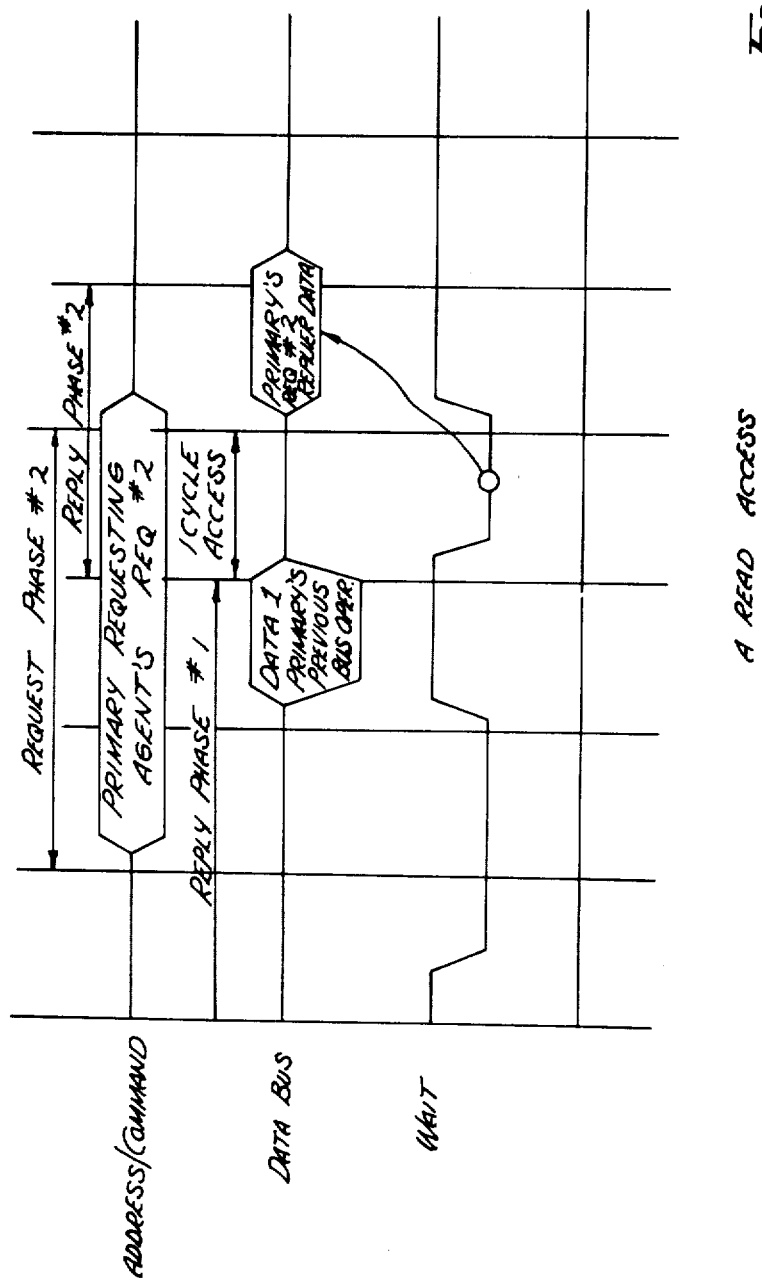
FIG. 16 is a timing diagram illustrating the local bus use of WAIT.

Referring now to FIG. 16, the present invention's unique use of a WAIT signal is illustrated. The WAIT signal may be used by all replying agents coupled to the local bus 56 to require that the reply phase be extended by injecting delay clock cycles. When pipelining is performed (the request phase of a current bus operation overlapped with a previous bus operation's reply phase), the assertion of the WAIT signal by the replying agent servicing the previous bus operation may cause extension of the current bus operation's request phase. As shown in FIG. 16, the primary processor 40 has asserted a request (using address lines 300 and command lines 310) to a replying agent coupled to the local bus 56. The replying agent servicing the previous bus operation has asserted, during the first clock cycle of the request phase of the current bus operation, a WAIT signal, which indicates to the primary requesting agent 40 that the replying agent servicing its previous bus operation was not able to receive the address and command information during the current bus clock cycle. If the addressed replying agent requires additional time in order to access and provide the requested data on the local bus, it must assert WAIT on the last clock cycle of the request phase. The requesting agent must continue asserting the WAIT signal until the appropriate number of access delay cycles have been injected. The use of the WAIT signal in order to effectively provide delay cycles in the local bus 56 would be common in the case where primary processor 40 is operating at a speed which is faster than the access time of, for example, a local memory resource 54, inasmuch as it will be recalled that local bus 56 is clocked at the same rate a the primary processor 40.

As shown in FIG. 16, the assertion of the WAIT signal in the first clock cycle of the request phase, results in the continued assertion of the primary requesting agent's request phase for an additional two clock cycles. Thus, the WAIT signal effectively interjects a delay into the state of the local bus lines but does not alter the local bus standard protocol. Although every request on local bus 56 is asserted for a minimum of two clock periods, a replying agent may respond to the request anytime after its receipt. In other words, a replying agent may respond as fast as one clock cycle after the assertion of a request (zero cycle delay), even though the requesting agent (the primary or secondary processor) is still asserting the request.

It will be noted, that the assertion of a WAIT signal after the first clock cycle of a request phase (i.e. during its second clock cycle) will have no effect on the particular request phase, and only affects the reply phase by extending it through the injection of delays. For example, as illustrated in FIG. 16, the request phase of the primary requesting agent's second bus operation begins during the clock cycle in which the reply phase of a previous bus operation was to be completed. If a WAIT signal has caused the reply phase of the previous bus operation to be delayed an additional one or more clock cycles, the request phase of the second bus operation will correspondingly be extended. An assertion of WAIT during the first clock cycle of the reply phase (the last clock cycle of the request) results in a delay in the replying agent's response until the clock cycle that the WAIT signal is deasserted by the replier. In the present embodiment, only the current replier has the right to assert the WAIT signal during a given bus operation's reply phase.

Figure 17:
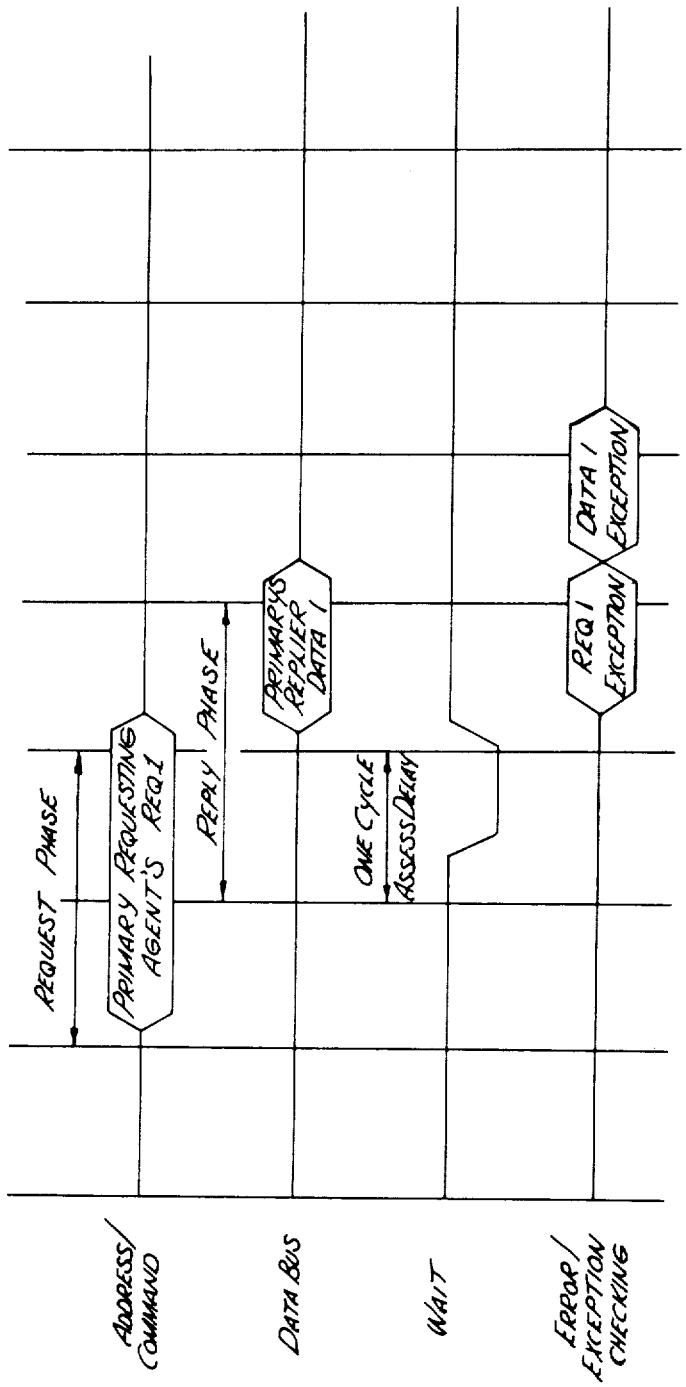
FIG. 17 is a timing diagram illustrating a local bus read access with WAIT and exception conditions.

FIG. 17 illustrates the use of the WAIT signal by a replying agent during the reply phase, as well as the present invention's exception cycles. As shown, the primary requesting agent has asserted a request (address and command information) on the address lines 300 and command lines 310. Since there was no WAIT signal asserted during the first clock cycle of the primary processor's request, the request phase lasted only for the minimum two clock cycles. The replying agent in response to the request asserted the WAIT signal during the first clock cycle of the reply phase (last clock cycle of the request phase), thereby notifying all bus agents that the requested bus operation will not be performed until WAIT is deasserted, and that all other bus functions will be delayed accordingly. In the present example, the replying agent required only a one cycle access delay in order to obtain data to be read by the primary requesting agent, and deasserted WAIT concurrently with the application of its reply on data lines 315. The deassertion of WAIT during the reply phase either signals the requesting agent that the read data on the local bus is valid and may be sampled, or that the "write data" driven by the requesting agent is sampled and the write operation is completed by the replying agent.

As illustrated in FIG. 17, a replying agent must notify the requesting agent (processor) of any errors or exceptions related to the issued request phase during the first data transfer period of the reply phase. In other words, in the presently preferred embodiment, any exceptions to a request are reported during the first data transfer period of the reply phase. In the event WAIT is not asserted during the last clock cycle of the request phase, an exception to this request phase is reported in this last clock cycle. Exceptions to data are reported during the clock cycle immediately following the application of data on data bus 315, as shown in FIG. 17.

Figure 18:
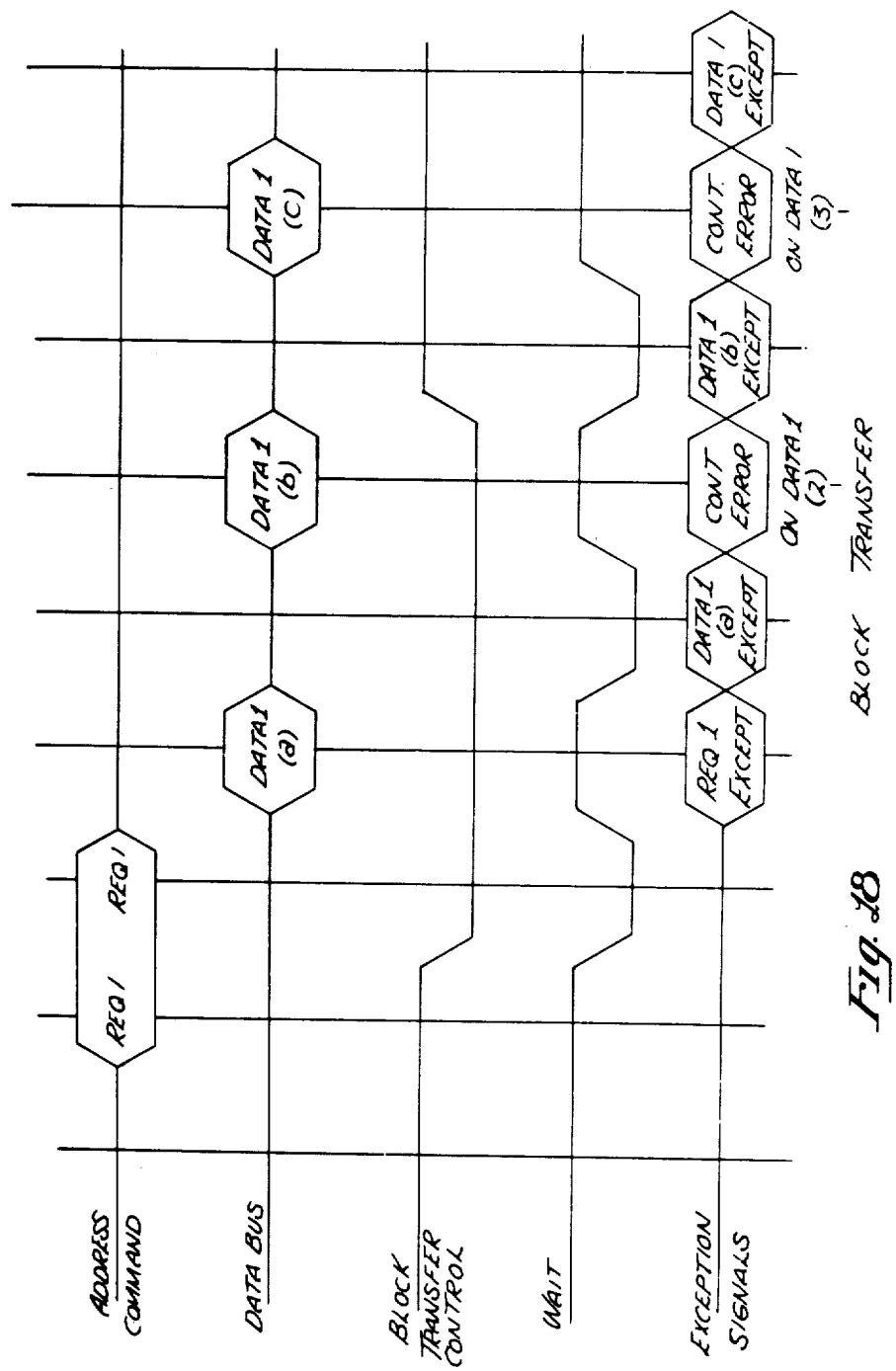
FIG. 18 is a timing diagram illustrating local bus block transfer and continuation error reporting.
Figure 21:
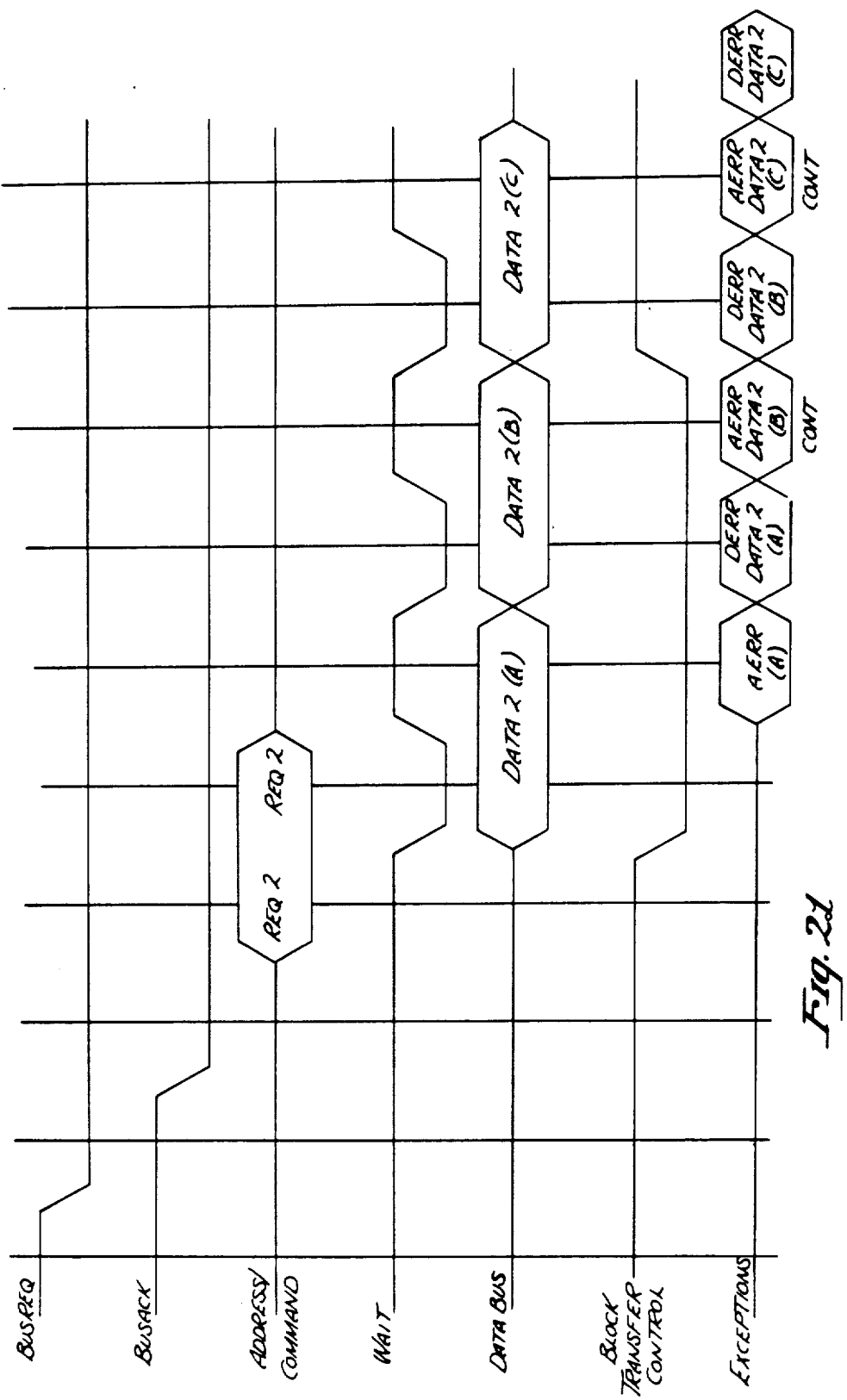
FIG. 21 is a timing diagram illustrating local bus block transfer and exception conditions.

FIGS. 18 and 21 illustrate the present invention's exception reporting protocol for requests, data, as well as "continuation" exceptions. As shown in FIG. 14, control lines 320 include address error (AERR) and data error (DERR) lines which are coupled between all agents on local bus 56. As previously described, exceptions to a request phase asserted by, for example, primary processor requesting agent 40, are reported to the requesting agent during the first data transfer period of the reply phase. Similarly, exceptions to data applied to data lines 315 are reported during the clock cycle immediately following the application of the data. In the present invention, continuation exceptions are reported on the address error signal line (AERR) to the requesting agent performing the bus operation, along the local bus. The AERR signal indicates that the data applied to the data bus is not being driven by the expected replying agent, and actually indicates that a continuation error [i.e., a physical boundry (overflow) error] has occurred. A continuation error may occur in the case of block transfers where the replying agent is incrementing the replier data address after each operation and exceeds the permissible address range of the replying agent. In such case, the replying agent indicates to the requesting agent that a continuation error has occurred by asserting the AERR line during the period when the requested data was to be valid. Thus, all continuation errors are reported concurrently with the clock cycle in which the data would otherwise be valid. Continuation errors may also be reported by a replying agent which does not support block transfers where a block transfer request has been made. If a WAIT signal has been asserted, this period would be delayed accordingly.

Figure 19:
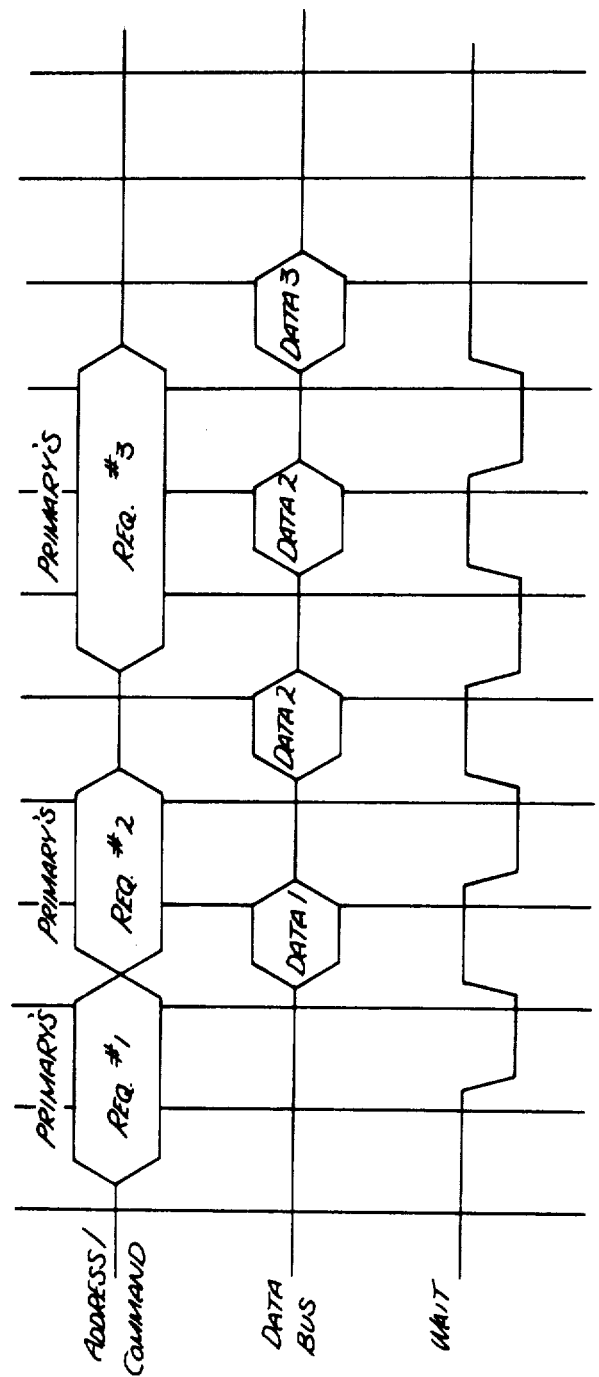
FIG. 19 is a timing diagram illustrating local bus arbitration, pipe-lining and WAIT where the local bus is active under the control of the primary requesting agent.

Referring now to FIG. 19, the ability of local bus 56 to "pipeline" by permitting the overlapping of a request phase of a given requesting agent's bus operation with the reply phase of its previous bus operation is disclosed. In the present example, the primary processor 40 drives its first request phase onto the address and command lines. The primary requesting agent (processor) 40 may initiate its second bus operation immediately after the current request phase is complete if the first bus operation is not a block transfer. If the first bus operation is a block transfer, the second bus operation's request phase may not be initiated until the clock cycle during which the last data transfer period of the first bus operation is expected.

Figure 20:
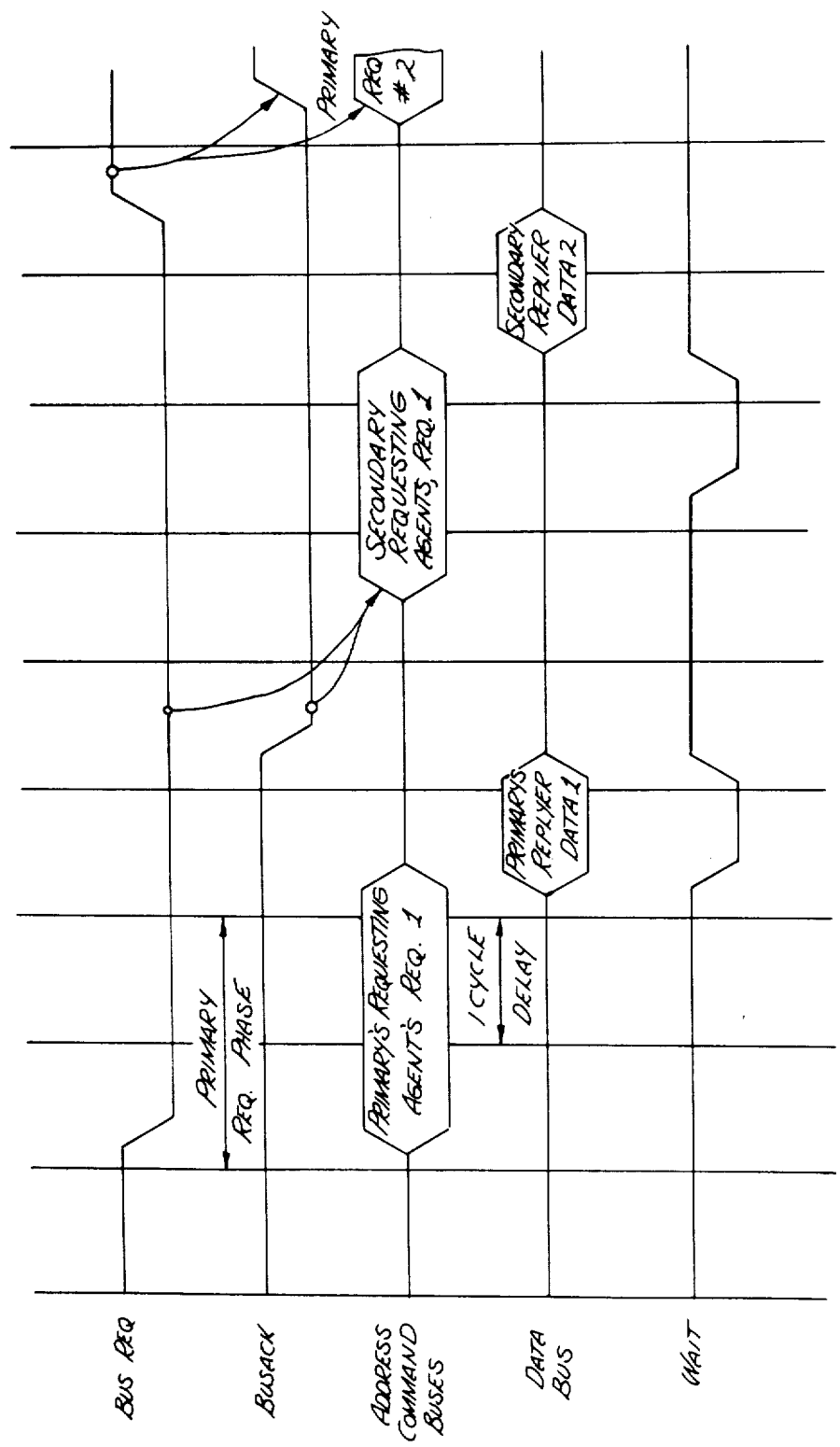
FIG. 20 is a timing diagram illustrating local bus arbitration and WAIT where the local bus is initially under the control of the primary requesting agent.

FIG. 20 illustrates the case where the primary requesting agent 40 has gained access to the local bus 56, and where the secondary requesting agent 57 requires bus access. As shown, secondary processor 57 asserts the BUS REQ line during the request phase of the primary requesting agent. The primary requesting agent is required not to release the local bus to the secondary requesting agent any earlier han the clock cycle following the end of its reply phase. As shown, the request phase of the secondary requesting agent 57 starts the clock cycle, following the clock cycle BUS ACK is asserted by the primary requesting agent 40.

FIG. 20 also illustrates the timing for the secondary requesting agent 57 releasing the lines to the primary 40 upon completion of its reply phase. As indicated, the earliest the secondary requesting agent can release the ownership of the bus back to the primary requesting agent is the clock cycle following the last clock cycle of its reply phase. This is achieved by the secondary requesting agent 57 deasserting its BUS REQ signal. In the following clock cycle, the primary requesting agent 40 must deassert the BUS ACK signal, and may start the request phase of a new bus operation.

In the example illustrated in FIG. 20, the replying agent 40 has asserted the WAIT signal during the first clock cycle of the secondary requesting agent's reply phase, thereby delaying the assertion of data for an additional clock cycle. The deassertion of the WAIT signal on the following cycle indicates that "read" data on the data lines is valid and must be accepted by the requesting agent. The WAIT signal is also used to inject the one clock delay in the reply phase of the secondary requesting agent's bus operation.

Figure 22:
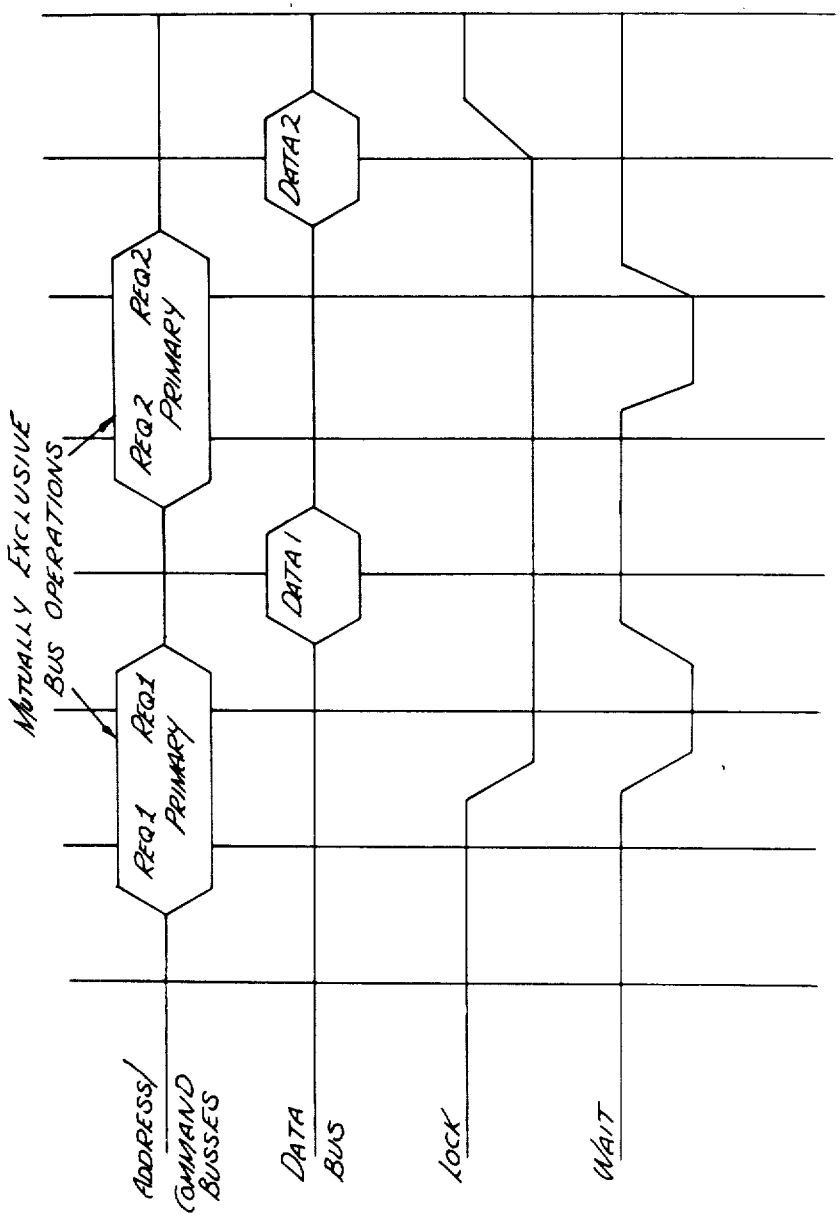
FIG. 22 is a timing diagram illustrating local bus mutually exclusive operations under a LOCK signal.

In addition to the WAIT control signal, local bus 56 incorporates other control lines such as LOCK which is a signal mechanism through which mutually exclusive bus operations may be enforced. The LOCK signal is driven by a requesting agent and is received by all replying agents coupled to the local bus 56. The LOCK signal can be asserted by the requesting agent which has ownership of the bus at any given time. All replying agents must monitor the LOCK signal, and if they are included in the bus operation with LOCK asserted, they must lock any non-local bus ports, and remain locked until LOCK is deasserted. It is the responsibility of both the primary and secondary requesting agents not to release their ownership of the bus until its associated set of mutually exclusive bus operation is complete, and LOCK is deasserted. As shown in FIG. 22, the effect of the LOCK signal is to invoke a mutual exclusion condition which allws a given bus agent to perform a sequence of bus operations to a replying agent without permitting any other requesting agent to use that replying agent in the interim. More particularly, if the local bus 56 includes multi-ported replying agents, the mutual exclusion function requires a lock-out of all non-local bus ports.

Although FIGS. 15-22 have been described with reference to a primary or secondary agent accessing and receiving data from a memory resource 54 or the like, it will be appreciated that the same data transfer protocol may be used in the case where a requesting agent (processor) is writing data into a memory resource 54, processor or other data processing device. In the case of a write operation, the replying agent through the use of WAIT may interject pauses within the bus state, such that buffers may-be allocated and th data received and checked for errors. The requesting agent driving data during a write operation must extend the driving of the data to the next clock cycle if-WAIT is also asserted in that clock cycle (see FIG. 21).

SUMMARY

In accordance with the previous discussion, it will be apparent to one skilled in the art that the present invention provides a unique system data bus architecture and data transfer protocols not previously known in the prior art. The present invention's parallel bus 35 permits high speed transfers of large quantities of data between agents coupled to the bus, which by way of example may include data transfers between processing units, global memories, or other data processing devices. Similarly, the present invention's serial bus 37 permits efficient message transferring capability between agents within the bus structure thereby eliminating message passing traffic on the parallel bus 35. Moreover, local bus 56 provides a high speed, high band-width parallel bus for data transfer between a primary processor and a plurality of local resources without impacting the available band-width of other system buses.

Although the present invention has been illustrated using FIGS. 1-24, and with reference to particular data transfer examples, it will be appreciated by one skilled in the art that the present invention has utility far exceeding the relatively simple transfer examples discussed.

We claim:

1. A high speed serial bus including an SDA line, an SDB line and a ground reference line, for transferring data comprised of a plurality of bits between a plurality of data processing devices ("agents") coupled to said bus, comprising:

message control means coupled between each of said agents and said serial bus for transferring data in the form of digital signals representing said plurality of bits between a transmitting and a receiving agent along said serial bus, said message control means including:

transmitter means coupled to said serial bus for transmitting data provided by an agent, said data in the form of said digital signals being driven on said SDA and SDB lines 180° out of phase with respect to one another such that the combination of said digital signals on each of said SDA and SDB lines relative to said ground reference line represents said bits comprising said data;

bus state detector means coupled to said serial bus for detecting collisions of data transmitted by at least two agents over said bus, said collision being detected in the event said SDA and SDB lines are at a first logical state relative to said ground reference line, said bus state detector sensing an idle bus on which no data has been transmitted when said SDA and SDB lines are at a second logical state inverse to said first logical state relative to said ground reference line;

receiving means coupled to said bus state detector means for receiving said digital signals representing said data and reconstructing said data into the form transmitted by said transmitting agent;

message serial control logic including arbitration means for providing an orderly allocation of access to said serial bus for said transmitting agents, such that said arbitration means initiates an arbitration cycle wherein each agent coupled to said serial bus;

generates a JAM signal driving both of said serial bus lines SDA and SDB to the same logic state for a predetermined time;

maintains said serial bus idle for a predetermined time such that any residual electrical signals on said bus lines are damped; and maintains said serial bus in a "WAIT" state to insure that a valid JAM signal has occurred and then maintains said bus in an idle state for an additional "CLEAR" period to permit the resynchronization of all agents;

whereby data is serially transferred between agents coupled to said bus.

2. The serial bus as defined by claim 1, wherein said arbitration cycle further includes the allocation of sequential time slots, at least some of said time slots corresponding to particular agents coupled to said serial bus; each agent retransmitting its data once said arbitration cycle has counted up to the particular agent's allocated time slot, said sequential counting of time slots temporarily ceasing during the transmission of data by an agent within its time slot.

3. The serial bus as defined by claim 2, wherein said time slots comprise a plurality of sub-time slots, at least some of said sub-time slots corresponding to different agents coupled to said bus.

4. The serial bus as defined by claim 3, wherein said bus state detector includes simultaneously clocked and serially coupled D-latches coupled to said SDA and SDB lines of said serial bus, for receiving said digital signals over said bus and converting said signals into bits corresponding to said data, said D-latches permitting comparison of sequential data bits received on said serial bus.

5. The serial bus as defined by claim 4, wherein said bus state detector includes detector logic means coupled to said serially coupled D-latches and to said ground reference line for detecting said collisions along said serial bus.